United States Patent
Liu

(10) Patent No.: US 10,609,625 B2
(45) Date of Patent: Mar. 31, 2020

(54) INFORMATION EXCHANGED METHOD AND DEVICE

(71) Applicant: China Academy of Telecommunications Technology, Beijing (CN)

(72) Inventor: Jiamin Liu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 113 days.

(21) Appl. No.: 15/578,547

(22) PCT Filed: May 6, 2016

(86) PCT No.: PCT/CN2016/081239
§ 371 (c)(1),
(2) Date: Nov. 30, 2017

(87) PCT Pub. No.: WO2016/192508
PCT Pub. Date: Dec. 8, 2016

(65) Prior Publication Data
US 2018/0176855 A1 Jun. 21, 2018

(30) Foreign Application Priority Data
Jun. 3, 2015 (CN) .......................... 2015 1 0300582

(51) Int. Cl.
*H04W 48/10* (2009.01)
*H04W 72/00* (2009.01)
(Continued)

(52) U.S. Cl.
CPC ......... *H04W 48/10* (2013.01); *H04W 72/005* (2013.01); *H04W 92/10* (2013.01);
(Continued)

(58) Field of Classification Search
CPC ... H04W 48/10; H04W 92/10; H04W 72/005; H04W 88/08; H04W 24/02; H04W 92/20
See application file for complete search history.

(56) References Cited

U.S. PATENT DOCUMENTS

| 2004/0203828 A1 | 10/2004 | Mirchandani et al. |
| 2006/0251013 A1* | 11/2006 | Roy ...................... H04W 28/18 370/329 |

(Continued)

FOREIGN PATENT DOCUMENTS

| CN | 101141782 A | 3/2008 |
| CN | 101185349 A | 5/2008 |

(Continued)

OTHER PUBLICATIONS

XP007907980 "Self-Organizing Networks (SON) in 3GPP Long Term Evolution" Sujuan Feng et al. Normor Research GmbH, Munich, Germany, May 20, 2018 (pp. 15).

*Primary Examiner* — Shailendra Kumar
(74) *Attorney, Agent, or Firm* — Foley & Lardner LLP

(57) ABSTRACT

An information exchange method and device for addressing a coordination problem between different access points (APs) caused by low exchange efficiency between the APs. The information exchange method provided in an embodiment of the present invention comprises: determining, by a transmitting AP, an air interface broadcast resource for transmitting information to a receiving AP; and transmitting, by the transmitting AP and based on the determined air interface broadcast resource, the information to the receiving AP in a broadcast form. Adopting the embodiment of the present invention not only allows an air interface transmission to be performed between the APs, but also allows communication between more than two APs. One AP can transmit information thereof, in the broadcast form, to all (Continued)

neighboring APs having a needing to exchange information therewith, thereby improving coordination efficiency between the APs.

9 Claims, 10 Drawing Sheets

(51) Int. Cl.
- *H04W 92/10* (2009.01)
- *H04W 88/08* (2009.01)
- *H04W 24/02* (2009.01)
- *H04W 92/20* (2009.01)

(52) U.S. Cl.
CPC ............ *H04W 24/02* (2013.01); *H04W 88/08* (2013.01); *H04W 92/20* (2013.01)

(56) References Cited

U.S. PATENT DOCUMENTS

| | | | |
|---|---|---|---|
| 2009/0275323 | A1 | 11/2009 | Pedersen et al. |
| 2010/0202391 | A1* | 8/2010 | Palanki ............. H04W 72/0426 370/329 |
| 2015/0072702 | A1* | 3/2015 | Chun .................... H04W 16/14 455/454 |
| 2015/0085758 | A1* | 3/2015 | Pham ................... H04L 5/0053 370/329 |
| 2018/0110001 | A1* | 4/2018 | Yasukawa ............... H04W 8/22 |

FOREIGN PATENT DOCUMENTS

| | | |
|---|---|---|
| CN | 102045795 A | 5/2011 |
| CN | 102090096 A | 6/2011 |
| CN | 102308652 A | 1/2012 |
| CN | 104349480 A | 2/2015 |

* cited by examiner

INFORMATION EXCHANGED METHOD AND DEVICE

This application is a US National Stage of International Application No. PCT/CN2016/081239, filed on May 6, 2016, designating the United States, and claiming priority to Chinese Patent Application No. 201510300582.X, filed with the Chinese Patent Office on Jun. 3, 2015 and entitled "Method and apparatus for exchanging information", which is hereby incorporated by reference in its entirety.

FIELD

The present invention relates to the field of communications, and particularly to a method and apparatus for exchanging information.

BACKGROUND

Evolved Node B's (eNBs) providing User Equipments (UEs) with an access service are connected with each other, and an eNB is connected with a core network node, in a wired manner in a Long Term Evolution (LTE) system. The eNBs exchange information with each other via an X2 interface. Since there is a long delay generally at the order of 20 ms via the X2 interface, the information exchanged between the eNBs via the X2 interface are generally semi-static information, and since dynamic information can not be exchanged between the eNBs, the eNBs can not dynamically interoperate in coordination.

In order to improve the transmission rate of data, and the throughput of a cell, a Relay Node (RN) is introduced to the LTE system. The RN accesses a core network through a donor evolved Node B (DeNB), and there is no direct wired interface between the RN and the core network node; and in this architecture, a User Equipment (UE) communicates with the RN via a radio interface Uu. and the RN can communicate with the DeNB via a radio interface Un, as illustrated in FIG. 1. In order to transmit downlink data between the RN and the DeNB, the DeNB firstly needs to transmit control signaling, which includes information of downlink scheduling of the RN, to the RN, and then can transmit the downlink data; and alike in order to transmit uplink data between the RN and the DeNB, the RN firstly needs to transmit an uplink transmission request to the DeNB, and can transmit the uplink data after being provided with an uplink transmission resource.

In an ultra-dense network, there is a large intersection between coverage areas of different eNBs, and the distance between eNBs is short, thus making it possible to establish a radio interface between the eNBs. In a scenario where access points are deployed ultra-densely, if the eNBs can interact with each other via a radio interface, then the delay may be well shortened as compared with the existing X2 interface to thereby improve the efficiency of exchanging information between the eNBs.

In order to transmit information between the eNBs via an air interface, the transmission procedures above between the RN and the DeNB via an air interface can be applied. However, the coordination is not limited to two eNBs, in general, resources to be occupied, and data to be transmitted need to coordinated between adjacent eNBs, so when the transmission procedures above between the RN and the DeNB via an air interface are applied, then every two eNBs may interact with each other, for example, if an eNB1, an eNB2, and an eNB3 coordinate with each other, then information may be exchanged respectively between the eNB1 and the eNB2, and between the eNB1 and the eNB3, and between the eNB2 and the eNB3.

Obviously the interaction mode above is so inefficient that may seriously discourage the eNBs and other access points from interoperating in coordination.

SUMMARY

Embodiments of the invention provide a method and apparatus for exchanging information so as to address the problem that there is such inefficient interaction between access points that may discourage the different access points from interoperating in coordination.

An embodiment of the invention provides a method for exchanging information, the method including:

determining, by a transmitting AP, an air interface broadcast resource for transmitting information to a receiving AP; and transmitting, by the transmitting AP, information to the receiving AP by broadcasting the information over the determined air interface broadcast resource.

Optionally the determining, by the transmitting AP, the air interface broadcast resource includes:

determining, by the transmitting AP, a periodic air interface broadcast resource; or when the transmitting AP needs to transmit information to the receiving AP, determining, by the transmitting AP, an air interface broadcast resource for currently transmitting information to the receiving AP.

Optionally the determining, by the transmitting AP, the air interface broadcast resource includes:

receiving, by the transmitting AP, the air interface broadcast resource transmitted by a first network-side device.

Optionally before the transmitting AP receives the air interface broadcast resource transmitted by the first network-side device, the method further comprises:

transmitting, by the transmitting AP, a resource request message including resource demand information to the first network-side device to request for the air interface broadcast resource.

Optionally the first network-side device is any one of the following network-side devices:

a centralized control node managing respective APs in a preset area range;

an OAM entity; and a cluster head AP which is an AP selected from a set of APs including the transmitting AP, wherein any one AP in the set and the cluster head AP can receive air interface information transmitted from each other by broadcasting the information.

Optionally determining, by the transmitting AP, the air interface broadcast resource for transmitting information to the receiving AP includes:

selecting, by the transmitting AP, the air interface broadcast resource for transmitting information to the receiving AP from a preset pool of air interface broadcast resources; or receiving, by the transmitting AP, a pool of air interface broadcast resources configured by a second network-side device, and selecting the air interface broadcast resource for transmitting information to the receiving AP from the pool of air interface broadcast resources.

Optionally the second network-side device is a centralized control node managing respective APs in a preset area range, or an OAM entity.

Optionally after the transmitting AP transmits the information to the receiving AP by broadcasting the information over the determined air interface broadcast resource, the method further includes:

determining, by the transmitting AP, whether the information transmitted by the transmitting AP over the selected air interface broadcast resource is transmitted successfully, according to a feedback message of the receiving AP for the information; and if the information is not transmitted successfully, then reselecting an air interface broadcast resource, and retransmitting the information over the reselected air interface broadcast resource.

Optionally the determining, by the transmitting AP, whether the information transmitted by the transmitting AP is transmitted successfully, according to the feedback message of the receiving AP for the information includes:

determining, by the transmitting AP, whether the information transmitted by the transmitting AP is transmitted successfully, according to a feedback message of any one receiving AP for the information; or determining, by the transmitting AP, whether the information transmitted by the transmitting AP is transmitted successfully, according to a feedback message of a cluster head AP for the information, wherein the cluster head AP is an AP selected from a set of APs including the transmitting AP, and any one AP in the set and the cluster head AP can receive air interface information transmitted from each other by broadcasting the information.

Optionally after the transmitting AP selects the air interface broadcast resource for transmitting information to the receiving AP, the method further includes:

transmitting, by the transmitting AP, resource preemption signaling to the receiving AP to indicate the air interface broadcast resource selected by the transmitting AP.

Optionally the determining, by the transmitting AP, the air interface broadcast resource for transmitting information to the receiving AP includes:

determining, by the transmitting AP, whether the selected air interface broadcast resource is preempted successfully, according to a feedback message of the receiving AP for the resource preemption signaling; and determining, by the transmitting AP, the selected air interface broadcast resource as the air interface broadcast resource for transmitting information to the receiving AP, upon determining that the selected air interface broadcast resource is preempted successfully.

Optionally the determining, by the transmitting AP, whether the selected air interface broadcast resource is preempted successfully, according to the feedback message of the receiving AP for the resource preemption signaling includes:

determining, by the transmitting AP, whether the selected air interface broadcast resource is preempted successfully, according to a feedback message of any one receiving AP for the resource preemption signaling; or determining, by the transmitting AP, whether the selected air interface broadcast resource is preempted successfully, according to a feedback message of a cluster head AP for the resource preemption signaling, wherein the cluster head AP is an AP selected from a set of APs including the transmitting AP, and any one AP in the set and the cluster head AP can receive air interface information transmitted from each other by broadcasting the information.

Another embodiment of the invention provides a method for exchanging information, the method including:

configuring, by a first network-side device, a transmitting AP with an air interface broadcast resource for the transmitting AP to transmit information to a receiving AP; and transmitting, by the first network-side device, the configured air interface broadcast resource to the transmitting AP so that the transmitting AP transmits information to the receiving AP by broadcasting the information over the air interface broadcast resource.

Optionally the configuring, by the first network-side device, the transmitting AP with the air interface broadcast resource includes:

configuring, by the first network-side device, the transmitting AP with a periodic air interface broadcast resource; or configuring, by the first network-side device, the transmitting AP with an air interface broadcast resource for currently transmitting information to the receiving AP, upon determining that the transmitting AP needs to transmit information to the receiving AP.

Optionally the configuring, by the first network-side device, the transmitting AP with the air interface broadcast resource includes:

receiving, by the first network-side device, a resource request message transmitted by the transmitting AP; and configuring, by the first network-side device, the transmitting AP with the air interface broadcast resource according to resource demand information in the resource request message.

Optionally after the first network-side device configures the transmitting AP with the air interface broadcast resource, the method further comprises:

indicating, by the first network-side device, the air interface broadcast resource configured for the transmitting AP to respective receiving APs for the transmitting AP so that each receiving AP receives information transmitted from the transmitting AP by broadcasting the information, over the air interface broadcast resource.

Optionally the first network-side device is any one of the following network-side devices:

a centralized control node managing respective APs in a preset area range;

an OAM entity; and a cluster head AP which is an AP selected from a set of APs including the transmitting AP, wherein any one AP in the set and the cluster head AP can receive air interface information transmitted from each other by broadcasting the information.

Optionally the first network-side device is the cluster head AP; and configuring, by the first network-side device, the air interface broadcast resource for the transmitting AP comprises:

determining, by the cluster head AP, the air interface broadcast resource for the transmitting AP from a preset pool of air interface broadcast resources; or receiving, by the cluster head AP, a pool of air interface broadcast resources configured by a second network-side device, and configuring the transmitting AP with the air interface broadcast resource from the pool of air interface broadcast resources.

Optionally the second network-side device is a centralized control node managing respective APs in a preset area range, or an OAM entity.

Another embodiment of the invention provides a method for exchanging information, the method including:

configuring, by a second network-side device, a pool of air interface broadcast resources; and transmitting, by the second network-side device, the configured pool of air interface broadcast resources so that each AP transmits information to other APs by broadcasting the information over an air interface broadcast resource in the pool of air interface broadcast resources.

Optionally transmitting, by the second network-side device, the configured pool of air interface broadcast resources includes:

transmitting, by the second network-side device, the configured pool of air interface broadcast resources to respective APs in a preset area range so that each AP selects an air interface broadcast resource for transmitting information to the other APs from the pool of air interface broadcast resources; or transmitting, by the second network-side device, the configured pool of air interface broadcast resources to a cluster head AP in each set of APs in a preset area range so that the cluster head AP configures air interface broadcast resources for the APs in the set including the cluster head AP, wherein for each set of APs, any one AP in the set and the cluster head AP can receive air interface information transmitted from each other by broadcasting the information.

Another embodiment of the invention provides a method for exchanging information, the method including:

determining, by a receiving AP, an air interface broadcast resource occupied by a transmitting AP; and receiving, by the receiving AP, information transmitted from the transmitting AP by broadcasting the information, over the determined air interface broadcast resource.

Optionally the determining, by the receiving AP, the air interface broadcast resource occupied by the transmitting AP includes:

determining, by the receiving AP, a periodic air interface broadcast resource occupied by the transmitting AP; or determining, by the receiving AP, an air interface broadcast resource to be occupied by the transmitting AP for currently transmitting information.

Optionally the determining, by the receiving AP, the air interface broadcast resource occupied by the transmitting AP includes:

receiving, by the receiving AP, the air interface broadcast resource of the transmitting AP from a first network-side device; or receiving, by the receiving AP, a pool of air interface broadcast resources configured by a second network-side device, wherein the pool of air interface broadcast resources includes air interface broadcast resources which can be occupied by respective APs in a preset area range; or receiving, by the receiving AP, resource preemption signaling transmitted by any one transmitting AP, and determining an air interface broadcast resource indicated in the resource preemption signaling as the air interface broadcast resource occupied by the any one transmitting AP.

Optionally after the receiving AP receives the resource preemption signaling transmitted by the any one transmitting AP, the method further includes:

transmitting, by the receiving AP, a feedback message for the resource preemption signaling to the any one transmitting AP.

Optionally after the receiving AP receives the information transmitted from the transmitting AP by broadcasting the information, over the determined air interface broadcast resource, the method further includes:

transmitting, by the receiving AP, a feedback message for the received information to the transmitting AP.

Optionally the receiving AP is a cluster head AP which is an AP selected from a set of APs including the cluster head AP, wherein any one AP in the set and the cluster head AP can receive air interface information transmitted from each other by broadcasting the information.

Another embodiment of the invention provides an apparatus for exchanging information, the apparatus including:

a determining module configured to determine an air interface broadcast resource for a transmitting AP to transmit information to a receiving AP; and a transmitting module configured to transmit information to the receiving AP by broadcasting the information over the air interface broadcast resource determined by the determining module.

Another embodiment of the invention provides an apparatus for exchanging information, the apparatus including:

a configuring module configured to configure a transmitting AP with an air interface broadcast resource for the transmitting AP to transmit information to a receiving AP; and a transmitting module configured to transmit the air interface broadcast resource configured by the configuring module to the transmitting AP so that the transmitting AP transmits information to the receiving AP by broadcasting the information over the air interface broadcast resource.

Another embodiment of the invention provides an apparatus for exchanging information, the apparatus including:

a configuring module configured to configure a pool of air interface broadcast resources; and a transmitting module configured to transmit the configured pool of air interface broadcast resources so that each AP transmits information to other APs by broadcasting the information over an air interface broadcast resource in the pool of air interface broadcast resources.

Another embodiment of the invention provides an apparatus for exchanging information, the apparatus including:

a determining module configured to determine an air interface broadcast resource occupied by a transmitting AP; and a receiving module configured to receive information transmitted from the transmitting AP by broadcasting the information, over the air interface broadcast resource determined by the determining module.

With the methods or apparatuses above, the transmitting AP determines the air interface broadcast resource for transmitting information to the receiving AP; and transmits information to the receiving AP by broadcasting over the determined air interface broadcast resource. With the embodiments of the invention, the APs can transmit with each other via an air interface, and more than two APs can communicate with each other, where one of the APs can transmit its coordination information to all the adjacent APs to exchange information with the AP, by broadcasting the coordination information to the adjacent APs, thus improving the efficiency of the APs interoperating in coordination.

DETAILED DESCRIPTION

In the technical solutions according to the embodiments of the invention, a transmitting AP determines an air interface broadcast resource for transmitting information to a receiving AP; and transmits the information to the receiving AP by broadcasting the information over the determined air interface broadcast resource. With the technical solutions according to the embodiments of the invention, the AP can transmit with each other via an air interface, and more than two APs can communicate with each other, where one of the APs can transmit its coordination information to all the adjacent APs to exchange information with the AP, by broadcasting the coordination information to the adjacent APs, thus improving the efficiency of the APs interoperating in coordination.

An AP in the embodiments of the invention can be an eNB, an RN, or another node providing a UE with an access service.

The embodiments of the invention will be described below in further details with reference to the drawings.

First Embodiment

In this embodiment, a first network-side device allocates periodic air interface broadcast resources for respective APs in a coverage area thereof.

Figure 1:
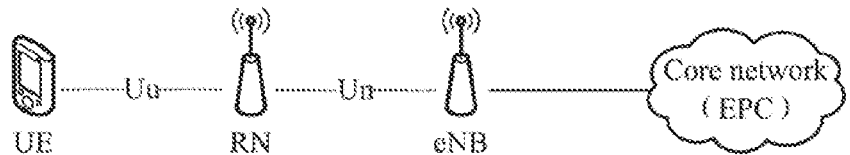
FIG. 1 is a schematic diagram of an access network including an RN.
Figure 2:
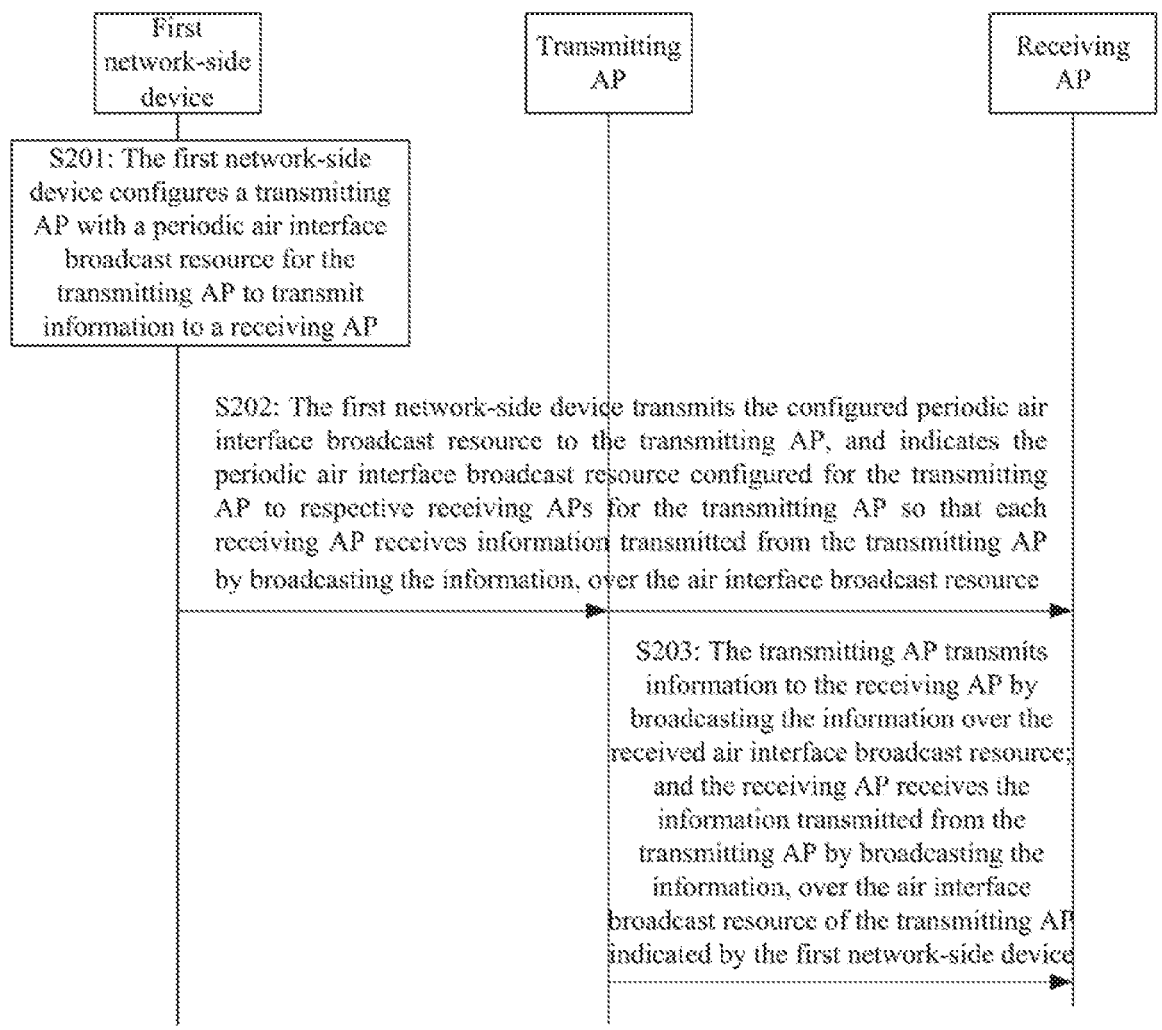
FIG. 2 is a flow chart of a method for exchanging information according to a first embodiment of the invention.

As illustrated in FIG. 2, there is illustrated a flow chart of a method for exchanging information according to a first embodiment of the invention, where the method includes the following steps.

In the step S201, the first network-side device configures a transmitting Access Point (AP) with a periodic air interface broadcast resource for the transmitting AP to transmit information to a receiving AP.

The first network-side device can be a centralized control node, an Operation Administration and Maintenance (OAM) entity, or a cluster head AP. The centralized control node is a node managing respective APs in a preset area range, and can refer to a separate device, e.g., a macro eNB, or can refer to a module performing a centralized control function. The cluster head AP is an AP selected from a set of APs, where any one AP in each set of APs, and a cluster head AP in the set of AP can receive air interface information transmitted from each other by broadcasting. The cluster head AP in the embodiment of the invention can be a head AP with some leading and control function, where the head AP is a normal AP on which some additional condition is placed, for example, with a more powerful software or hardware function, with a required support of an additional control function, with a higher quality of backhaul link, etc. In a scenario where access points are deployed densely, the APs are generally deployed in clusters, e.g., an office, a building, etc., or respective APs in a hotspot region belong to a cluster of APs; and all the APs in a cluster can communicate with a cluster head. Furthermore only a set of APs, where any two APs can receive information broadcasted by each other, can be defined as a cluster of APs.

When the first network-side device is a cluster head AP, then the cluster head AP may allocate air interface broadcast resources for respective APs in a set of AP including the cluster head AP from a pool of air interface broadcast resources allocated by a second network-side device (e.g., an OAM entity or a centralized control node).

In a specific implementation, each AP can operate as a transmitting AP for a receiving AP, or can operate as a receiving AP for a transmitting AP, that is, any one AP can broadcast information to another AP, or can receive information broadcasted by another AP. The receiving AP can be an adjacent AP to the transmitting AP corresponding thereto, and correspondingly the transmitting AP can be an adjacent AP to the receiving AP corresponding thereto, that is, the receiving AP can receive air interface information broadcasted by the transmitting AP in a signal coverage area of the transmitting AP corresponding thereto.

In a specific implementation, the centralized control node can collect a general condition of a network in a coverage area thereof. e.g., the positions and distribution of the APs, the distribution of UEs covered by the APs, load conditions of the APs, an overall condition of network resources, etc., collect measurement information reported by some APs, and allocate each AP with its periodic air interface broadcast resource for broadcasting air interface information after making a decision while taking the above information into account as whole.

Furthermore before the step S201, the transmitting AP can firstly transmit a resource request message including resource demand information (e.g., the size of a resource as demanded) to the first network-side device, and in the step S201, the first network-side device configures the transmitting AP with the periodic air interface broadcast resource, or can reconfigure a periodic air interface broadcast resource, according to the resource request message, that is, the resource is configured semi-statically in the embodiment of the invention.

In the step S202, the first network-side device transmits the configured periodic air interface broadcast resource to the transmitting AP, and indicates the periodic air interface broadcast resource configured for the transmitting AP to respective receiving APs for the transmitting AP so that each receiving AP receives information transmitted from the transmitting AP by broadcasting the information, over the air interface broadcast resource.

In a specific implementation, the first network-side device can allocate air interface broadcast resources collectively for the respective APs in the coverage area, and for each AP, the first network-side device indicates to the AP the air interface broadcast resources of the respective adjacent APs of the AP so that the AP receives air interface information broadcasted by the adjacent APs over a union set of the air interface broadcast resources of the respective adjacent APs. Specifically the first network-side device can indicate to the transmitting AP the air interface broadcast resources of the respective receiving APs for the transmitting AP (i.e., APs adjacent to the transmitting AP) (e.g., identification information of the respective receiving APs, and the air interface broadcast resources corresponding respectively to the identification information of the respective receiving APs), or can indicate directly to the transmitting AP the union set of the air interface broadcast resources of the respective receiving APs for the transmitting AP.

Alternatively the following simplified implementations can be adopted.

The first network-side device can alternatively transmit all the air interface broadcast resources allocated for the respective APs as an overall pool of air interface broadcast resources to the respective APs, and when each AP has no information to be broadcasted to the other APs, then the AP may attempt on receiving information broadcasted by the other APs over the overall pool of air interface broadcast resources.

Or, the first network-side device can alternatively transmit a union set of the currently allocated air interface broadcast resources of the respective APs to the respective APs, and when each AP has no information to be broadcasted to the other APs, then the AP may attempt on receiving information broadcasted by the other APs over the union set of the currently allocated air interface broadcast resources of the respective APs.

Or, when the first network-side device is a cluster head AP, then the cluster head AP may alternatively transmit a union set of air interface broadcast resources of a set of APs including the cluster head AP to the respective APs in the set of APs, and when the respective APs in the set of APs have no information to be broadcasted to the other APs, then they may attempt on receiving information broadcasted by the other APs over the union set of the air interface broadcast resources of the set of APs.

In the step S203, the transmitting AP transmits information to the receiving AP by broadcasting the information over the received air interface broadcast resource; and the receiving AP receives the information transmitted from the transmitting AP by broadcasting the information, over the air interface broadcast resource of the transmitting AP indicated by the first network-side device.

When the transmitting AP needs to exchange information with the adjacent APs, the transmitting AP transmits air interface information by broadcasting the information over the periodical air interface broadcast resource allocated by the centralized control node.

Optionally the receiving AP may receive the air interface broadcast resource of each transmitting AP for the receiving AP, and at this time, the receiving Ap receives information over the air interface broadcast resource of each transmitting AP; or the receiving AP may receive a union set of the air interface broadcast resources of the respective transmitting APs for the receiving AP, and at this time, the receiving AP receives information directly over the union set of the air interface broadcast resources.

Second Embodiment

In this embodiment, a transmitting AP determines autonomously a periodic air interface broadcast resource as a result of contention.

Figure 3:
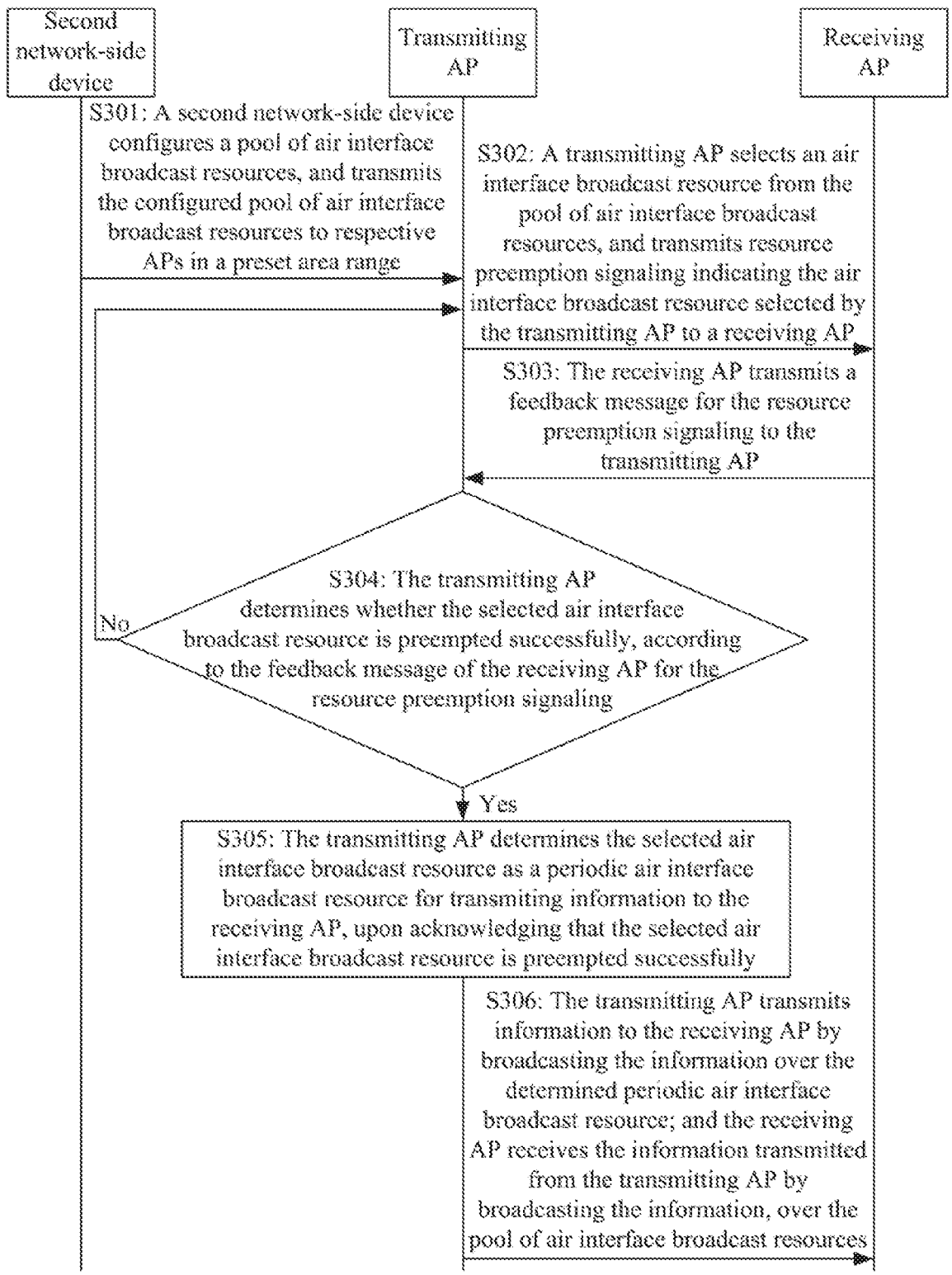
FIG. 3 is a flow chart of a method for exchanging information according to a second embodiment of the invention.

As illustrated in FIG. 3, there is illustrated a flow chart of a method for exchanging information according to the second embodiment of the invention, where the method includes the following steps.

In the step S301, a second network-side device (e.g., an Operation Administration and Maintenance (OAM) or a centralized control node) configures a pool of air interface broadcast resources, and transmits the configured pool of air interface broadcast resources to respective APs in a preset area range.

The pool of air interface broadcast resources is a set of resources, and can be configured statically, or can be configured semi-statically (adjusted according to a varying network condition in the preset area range). In a specific implementation, the pool of air interface broadcast resources may alternatively be preset, and at this time, it may not be configured by the second network-side device in this step. When the pool of air interface broadcast resources is configured by the second network-side device, then the second network-side device transmits the configured pool of air interface broadcast resources to the respective APs in the preset area range so that each AP selects from the pool an air interface broadcast resource for transmitting information to another AP.

In the step S302, a transmitting AP selects an air interface broadcast resource from the pool of air interface broadcast resources, and transmits resource preemption signaling indicating the air interface broadcast resource selected by the transmitting AP to a receiving AP.

In a specific implementation, when the transmitting AP transmits the resource preemption signaling to all the corresponding receiving APs, then the transmitting AP may transmit the signaling by broadcasting. Specifically the second network-side device can configure a pool of preemption signaling resources for broadcasting resource preemption signaling, and transmit it to the respective APs in the preset area range, so that the transmitting APs select preemption signaling resource from the pool of preemption signaling resources, and transmit resource preemption signaling to the receiving AP by broadcasting the signaling over the preemption signaling resource selected.

The transmitting AP can alternatively transmit the resource preemption signaling only to a cluster head AP so that the cluster head AP determines whether the selected air interface broadcast resource is available: and at this time, the transmitting AP can transmit the resource preemption signaling to the cluster head AP by broadcasting the signaling (the resource preemption signaling indicates that the receiving AP is the cluster head AP, or the receiving AP is the cluster head AP by default), or the transmitting AP can transmit the resource preemption signaling to the cluster head AP in a point-to-point mode.

In the step S303, the receiving AP transmits a feedback message for the resource preemption signaling to the transmitting AP.

Optionally the receiving AP can transmit an acknowledgement message for the resource preemption signaling to the transmitting AP upon determining that the resource preemption signaling is received correctly, and the air interface broadcast resource indicated in the resource preemption signaling does not conflict with any one of air interface broadcast resources of the receiving AP and the other transmitting APs for the receiving AP; and/or the receiving AP can transmit a non-acknowledgement message for the resource preemption signaling to the transmitting AP upon determining that the resource preemption signaling is received incorrectly, or the air interface broadcast resource indicated in the resource preemption signaling conflicts with one of air interface broadcast resources of the receiving AP, or the other transmitting APs for the receiving AP.

In the step S304, the transmitting AP determines whether the selected air interface broadcast resource is preempted successfully, according to the feedback message of the receiving AP for the resource preemption signaling; and if so, then the flow proceeds to the step S305; otherwise, the flow returns to the step S302.

In a specific implementation, each AP selects an appropriate air interface broadcast resource from the pool of air interface broadcast resources according to its demand and resource occupancy conditions of adjacent APs, and transmits the resource preemption signaling indicating the selected air interface broadcast resource, and when the AP receives a feedback message acknowledging the air interface broadcast resource available (e.g., an acknowledgement (ACK) message), or when the AP doesn't receive a feedback message acknowledging the air interface broadcast resource unavailable (e.g., a non-acknowledgement (NACK) message, where when no feedback message is received by the AP, then the air interface broadcast resource is acknowledged to be available by default), then the AP may determine that the selected air interface broadcast resource is preempted successfully, and subsequently transmit information over the air interface broadcast resource; or when the air interface broadcast resource needs to be reconfigured, then the AP may reselect an air interface broadcast resource, and retransmit resource preemption signaling. Correspondingly when the AP receives the resource preemption signaling correctly, and the air interface broadcast resource indicated in the resource preemption signaling does not conflict with any one of the air interface broadcast resources of the AP and the other known adjacent APs of the AP, then the AP may feed back an ACK message; otherwise, the AP may feed back an NACK message, or the AP may make no feedback (where by default no feedback represents that the air interface broadcast resource is acknowledged to be available).

Optionally in a specific implementation, for any one of the APs, when the AP is a transmitting AP, then the AP may determine whether the selected air interface broadcast resource is preempted successfully, according to a feedback message of any one receiving AP for resource preemption signaling, and at this time, the transmitting AP may transmit the resource preemption signaling by broadcasting the signaling.

In this implementation, the second network-side device (the OAM entity or the centralized control node) can preconfigure the respective APs in the preset area range with a pool of preemption signaling resources for broadcasting resource preemption signaling (which can alternatively be preset), and transmits the pool to the respective AP in the preset area range, so that the transmitting AP selects a preemption signaling resource from the pool of preemption signaling resources, and transmits the resource preemption signaling to the receiving AP by broadcasting the signaling over the selected preemption signaling resource; and correspondingly the receiving AP receives the resource preemption signaling broadcasted by the transmitting AP over the pool of preemption signaling resources, and makes a feedback.

Optionally the resource preemption signaling can alternatively be fed back only by the cluster head AP, and at this time, the transmitting AP can transmit the resource preemption signaling to the cluster head AP in a point-to-point mode (via a wired X2 interface, or in an air interface transmission procedure between an RN and a DeNB) (that is, the transmitting AP acknowledges to the cluster head AP whether the selected air interface broadcast resource is available). The transmitting AP can alternatively transmit the resource preemption signaling to the cluster head AP by broadcasting the signaling, and at this time, the transmitting AP can indicate in the broadcasted resource preemption signaling that the receiving AP is the cluster head AP, or a feedback is made by the cluster head AP by default, and the other APs make no feedback upon reception of the resource preemption signaling. Since the cluster head AP can communicate with all the other APs in the set, the cluster head AP can further configure the transmitting AP with the optimum air interface broadcast resource according to resource configurations of the respective APs in the set, so a feedback can be made only by the cluster head AP, thus reducing the amount of feedback information to be transmitted by the other APs, and also optimizing their resource configurations, as described in details in the following third embodiment.

In the step S305, the transmitting AP determines the selected air interface broadcast resource as a periodic air interface broadcast resource for transmuting information to the receiving AP, upon acknowledging that the selected air interface broadcast resource is preempted successfully.

In the step S306, the transmitting AP transmits information to the receiving AP by broadcasting the information over the determined periodic air interface broadcast resource; and the receiving AP receives the information transmitted from the transmitting AP by broadcasting the information, over the pool of air interface broadcast resources.

In this step, the receiving AP attempts to receive and process the information broadcasted by the transmitting AP, over the overall pool of air interface broadcast resources.

Alternatively to the step S306 above, the receiving AP can receive the information over the air interface broadcast resource indicated in the resource preemption signaling transmitted by the transmitting AP. Furthermore the receiving AP can receive the information transmitted from the transmitting AP by broadcasting the information, over the air interface broadcast resource indicated in the resource preemption signaling of the transmitting AP, upon determining that the transmitting AP can use the air interface broadcast resource.

Third Embodiment

In this embodiment, a transmitting AP selects autonomously a periodic air interface broadcast resource from a pool of air interface broadcast resources, requests a cluster head AP for acknowledgement, and determines the selected air interface broadcast resource as its periodic air interface broadcast resource upon acknowledgement by the cluster head AP.

Figure 4:
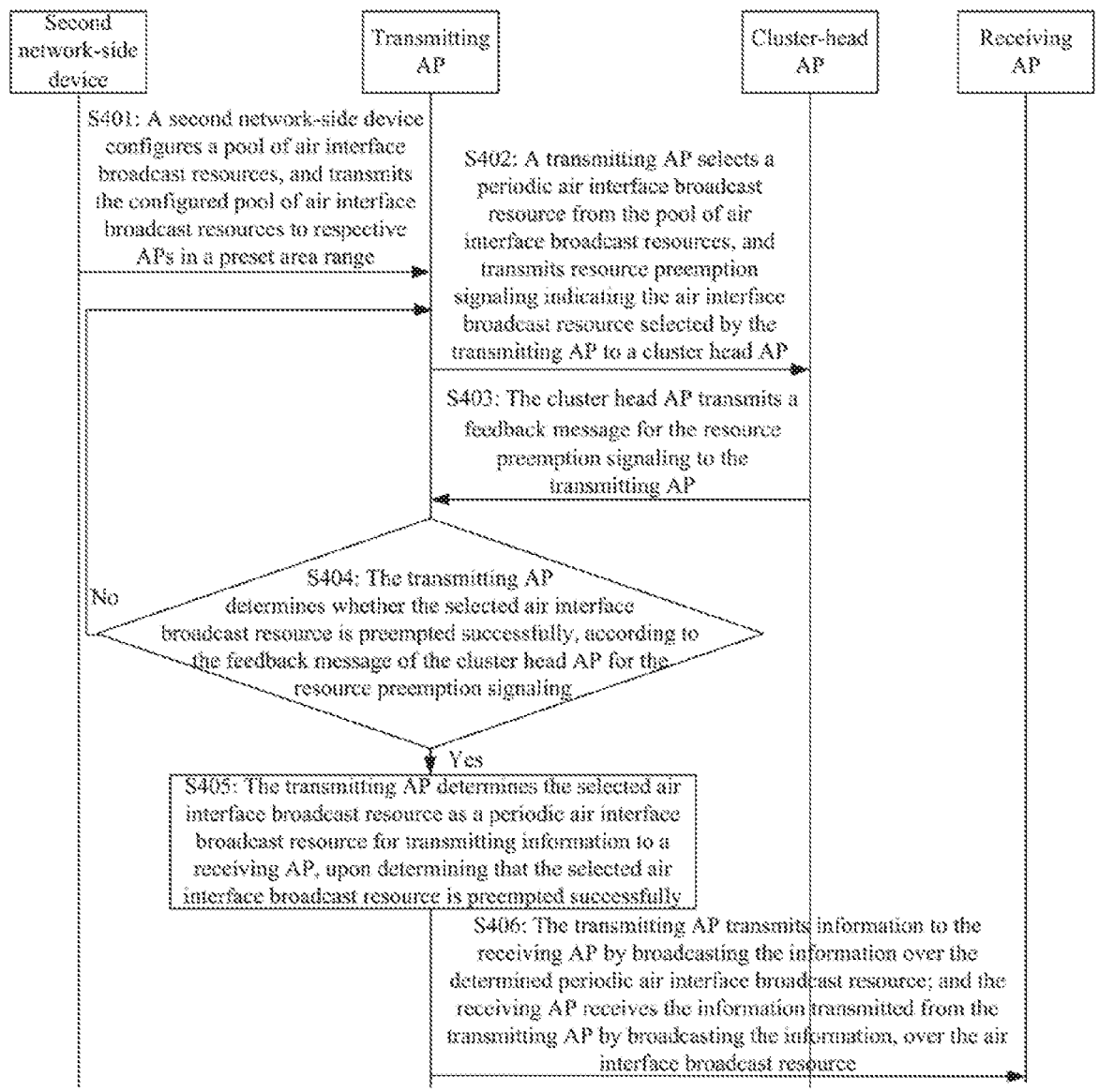
FIG. 4 is a flow chart of a method for exchanging information according to a third embodiment of the invention.

As illustrated in FIG. 4, there is illustrated a flow chart of a method for exchanging information according to the third embodiment of the invention, where the method includes the following steps.

In the step S401, a second network-side device (e.g., an Operation Administration and Maintenance (OAM) or a centralized control node) configures a pool of air interface broadcast resources, and transmits the configured pool of air interface broadcast resources to respective APs in a preset area range.

In the step S402, a transmitting AP selects a periodic air interface broadcast resource from the pool of air interface broadcast resources, and transmits resource preemption signaling indicating the air interface broadcast resource selected by the transmitting AP to a cluster head AP.

The transmitting AP may transmit the resource preemption signaling to the cluster head AP in a point-to-point mode, or may transmit the resource preemption signaling to the cluster head AP by broadcasting the signaling, and when the transmitting AP transmits the resource preemption signaling to the cluster head AP by broadcasting the signaling, then the transmitting AP may select a preemption signaling resource from a pool of preemption signaling resources as described in the second embodiment.

In the step S403, the cluster head AP transmits a feedback message for the resource preemption signaling to the transmitting AP.

In this embodiment, each AP selects an appropriate air interface broadcast resource from the pool of air interface broadcast resources according to its demand, and resource occupancy conditions of adjacent APs, and indicates the selected air interface broadcast resource to the cluster head AP for acknowledgement, and when the cluster head AP acknowledges the air interface broadcast resource available (for example, the cluster head AP feeds back ACK information), then the AP may determine that the air interface broadcast resource is preempted successfully, and transmit information over the air interface broadcast resource; and when the cluster head AP acknowledges the air interface broadcast resource unavailable (for example, the cluster head AP feeds back NACK information), then the AP may reselect an air interface broadcast resource, and indicate it to the cluster head AP for acknowledgement.

In the step S404, the transmitting AP determines whether the selected air interface broadcast resource is preempted successfully, according to the feedback message of the cluster head AP for the resource preemption signaling; and if so, then the flow proceeds to the step S405; otherwise, the flow returns to the step S402.

In the step S405, the transmitting AP determines the selected air interface broadcast resource as a periodic air interface broadcast resource for transmitting information to a receiving AP, upon determining that the selected air interface broadcast resource is preempted successfully.

In the step S406, the transmitting AP transmits information to the receiving AP by broadcasting the information over the determined periodic air interface broadcast resource; and the receiving AP receives the information transmitted from the transmitting AP by broadcasting the information, over the pool of the air interface broadcast resources.

The first to third embodiments have been described above in which the resource is configured semi-statically, where once the air interface broadcast resource is configured, information can subsequently be transmitted periodically over the air interface broadcast resource for a number of times, and the air interface broadcast resource can be reconfigured as needed.

A specific example of an application in which a resource is configured semi-statically as described above will be described below.

If there are 10 APs in some area, then these 10 APs may be provided with their air interface broadcast resources respectively as in any one of the first to third embodiments, that is, AP1: Resource 1 and Repetition Periodicity T1; AP2: Resource 2 and Repetition Periodicity T2; . . . ; and AP10: Resource 10 and Repetition Periodicity T10. A union set of these resources is Set A as known to each AP, so each AP transmits information respectively over its air interface broadcast resource as needed, and each AP receives and processes information of the other APs over the other air interface broadcast resources in the set A than the air interface broadcast resource thereof. In this embodiment of the invention, each AP can broadcast its information to the adjacent APs, and also each AP can receive information from the adjacent APs, so that the AP can adjust its state to thereby avoid interference, and interoperate with the other APs in coordination so as to improve the efficiency of transmission.

It shall be noted that the resources are allocated as described above, but the resource of each AP may not be exclusively allocated, and if another AP communicates beyond some range, then it may access the same resource as long as there is not any adjacent AP common to the two APs accessing the same resource.

Fourth and fifth embodiments may be described below in which a resource is configured dynamically as opposed to the first to third embodiments above in which a resource is configured semi-statically.

Fourth Embodiment

In this fourth embodiment, when an AP needs to transmit information an adjacent AP by broadcasting, the AP transmits a resource request message to a first network-side device to request for an air interface broadcast resource for transmitting information at this time.

Figure 5:
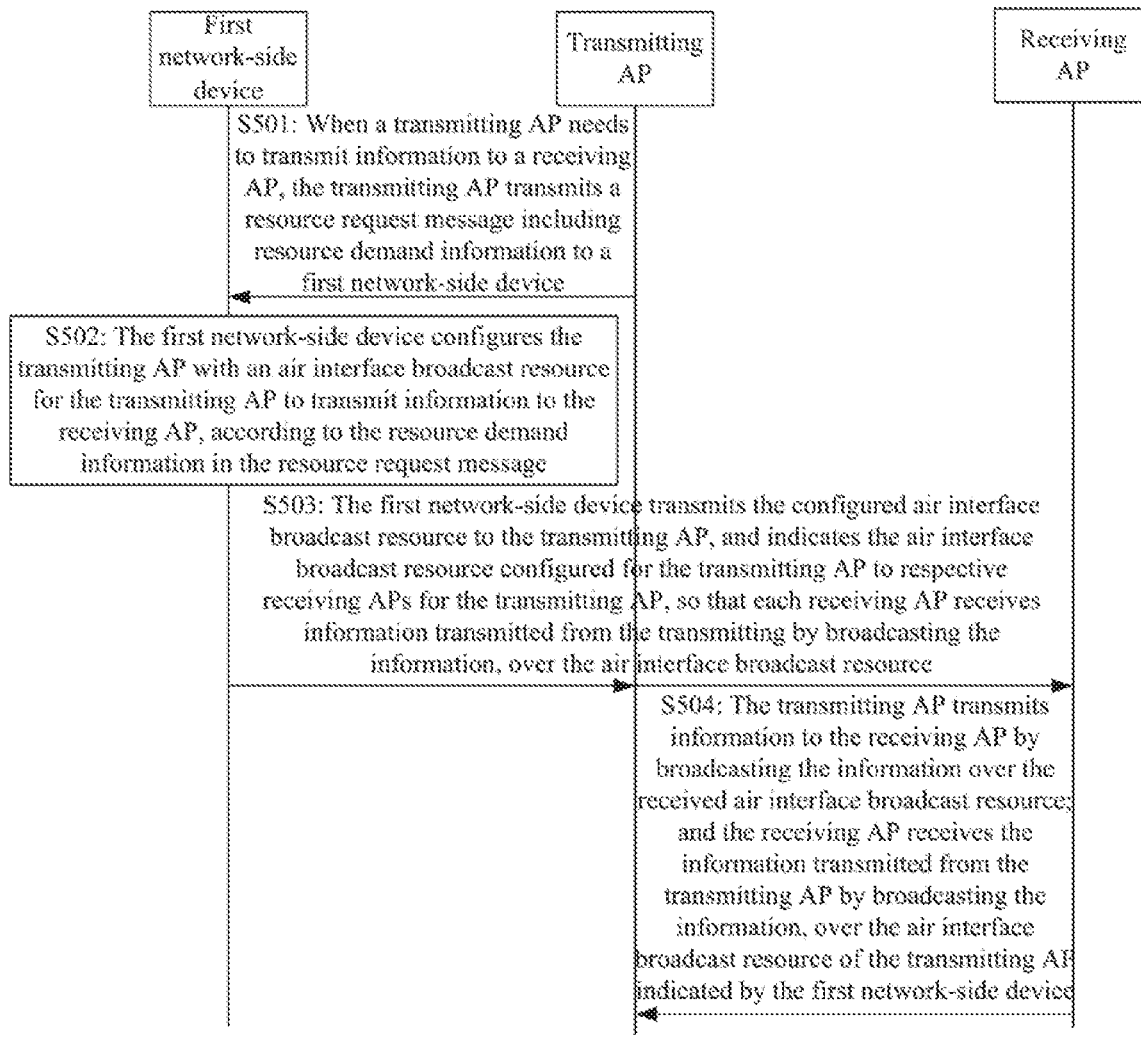
FIG. 5 is a flow chart of a method for exchanging information according to a fourth embodiment of the invention.

As illustrated in FIG. 5, there is illustrated a flow chart of a method for exchanging information according to a fourth embodiment of the invention, where the method includes the following steps.

In the step S501, when a transmitting AP needs to transmit information to a receiving AP, the transmitting AP transmits a resource request message including resource demand information to a first network-side device.

The resource demand information can include a resource size, and other resource demand information. Unlike the first to third embodiments above, each time the transmitting AP needs to transmit information to the receiving AP, the transmitting AP needs to request for an air interface broadcast resource in this embodiment.

In the step S502, the first network-side device configures the transmitting AP with an air interface broadcast resource for the transmitting AP to transmit information to the receiving AP, according to the resource demand information in the resource request message.

In a specific implementation, the first network-side device can configure each AP in a preset area range with an air interface broadcast resource according to resource demand information of each AP, an overall resource distribution and interference condition, etc.

In the step S503, the first network-side device transmits the configured air interface broadcast resource to the transmitting AP, and indicates the air interface broadcast resource configured for the transmitting AP to respective receiving APs for the transmitting AP, so that each receiving AP receives information transmitted from the transmitting AP by broadcasting the information, over the air interface broadcast resource.

In this step, for each AP, the first network-side device can indicate to the AP air interface broadcast resources of respective adjacent APs of the AP so that the AP receives information over the air interface broadcast resources of the respective adjacent APs. Specifically the first network-side device can indicate to the receiving AP air interface broadcast resources of respective transmitting APs for the receiving AP (adjacent APs of the receiving AP) (e.g., identification information of the respective transmitting APs, and air interface broadcast resources corresponding respectively to the identification information of the respective transmitting APs), or can indicate directly to the receiving AP a union set of air interface broadcast resources of respective transmitting APs for the receiving AP.

The first network-side device indicates the air interface broadcast resource of the AP only to some APs adjacent to the AP so that these AP prepare for receiving information, but those APs further away from the AP (beyond a reception and coverage area of the AP) can not receive any information of the AP, and thus do not need to know the air interface broadcast resource of the AP, and can also be avoided from attempting uselessly on receiving information. Still furthermore some APs further away from the AP can determine that the resource related to the AP is idle, and other useful data still can be transmitted over the resource. The first network-side device needs to determine a reception and coverage area of each AP in an optimized algorithm, e.g., based upon positional information, measurement information, reported information, etc., where such information is typically static information, and can be stored in a database, and updated as necessary.

Alternatively to the step S503 above in which the air interface broadcast resource configured for the transmitting AP is preferably indicated to the respective receiving APs for the transmitting AP (the APs adjacent to the transmitting AP), this step can be performed as simplified to thereby lower the complexity of the first network-side device in configuring and transmitting the information.

The first network-side device transmits all the air interface broadcast resources which can be allocated for the respective APs in the preset area range as an overall pool of air interface broadcast resources to the respective APs, and when each AP has no information to be broadcasted to the other APs, then the AP may attempt on receiving information broadcasted by the other APs over the overall pool of air interface broadcast resources.

Or, the first network-side device can alternatively transmit a union set of the currently allocated air interface broadcast resources of the respective APs to the respective APs, and when each AP has no information to be broadcasted to the other APs, then the AP may attempt on receiving information broadcasted by the other APs over the union set of the currently allocated air interface broadcast resources of the respective APs.

Or, when the first network-side device is a cluster head AP, then the cluster head AP may alternatively transmit a union set of air interface broadcast resources of a set of APs including the cluster head AP to the respective APs in the set of APs, and when the respective APs in the set of APs have no information to be broadcasted to the other APs, then they may attempt on receiving information broadcasted by the other APs over the union set of the air interface broadcast resources of the set of APs.

In the step S504, the transmitting AP transmits information to the receiving AP by broadcasting the information over the received air interface broadcast resource; and the receiving AP receives the information transmitted from the transmitting AP by broadcasting the information, over the air interface broadcast resource of the transmitting AP indicated by the first network-side device.

Reference can be made to the description above following the step S503 for details of this step.

In the fourth embodiment above, the first network-side device can be an OAM entity or a centralized control node, or can be a cluster head AP, and when the first network-side device is a cluster head AP, then the cluster head AP may allocate an air interface broadcast resource for each AP in a set of APs including the cluster head AP from a pool of air interface broadcast resources configured by a second network-side device (OAM entity or centralized control node), and the cluster head AP may notify the air interface broadcast resource allocated for each AP respectively to the corresponding AP, or may notify the air interface broadcast resources by broadcasting them, and when the cluster head AP notifies the air interface broadcast resources by broadcasting them, then it may indicate the air interface broadcast resource allocated respectively for each AP in a broadcast notification message.

Fifth Embodiment

In this embodiment, respective APs contend randomly with each other for an air interface broadcast resource for currently transmitting information.

Figure 6:
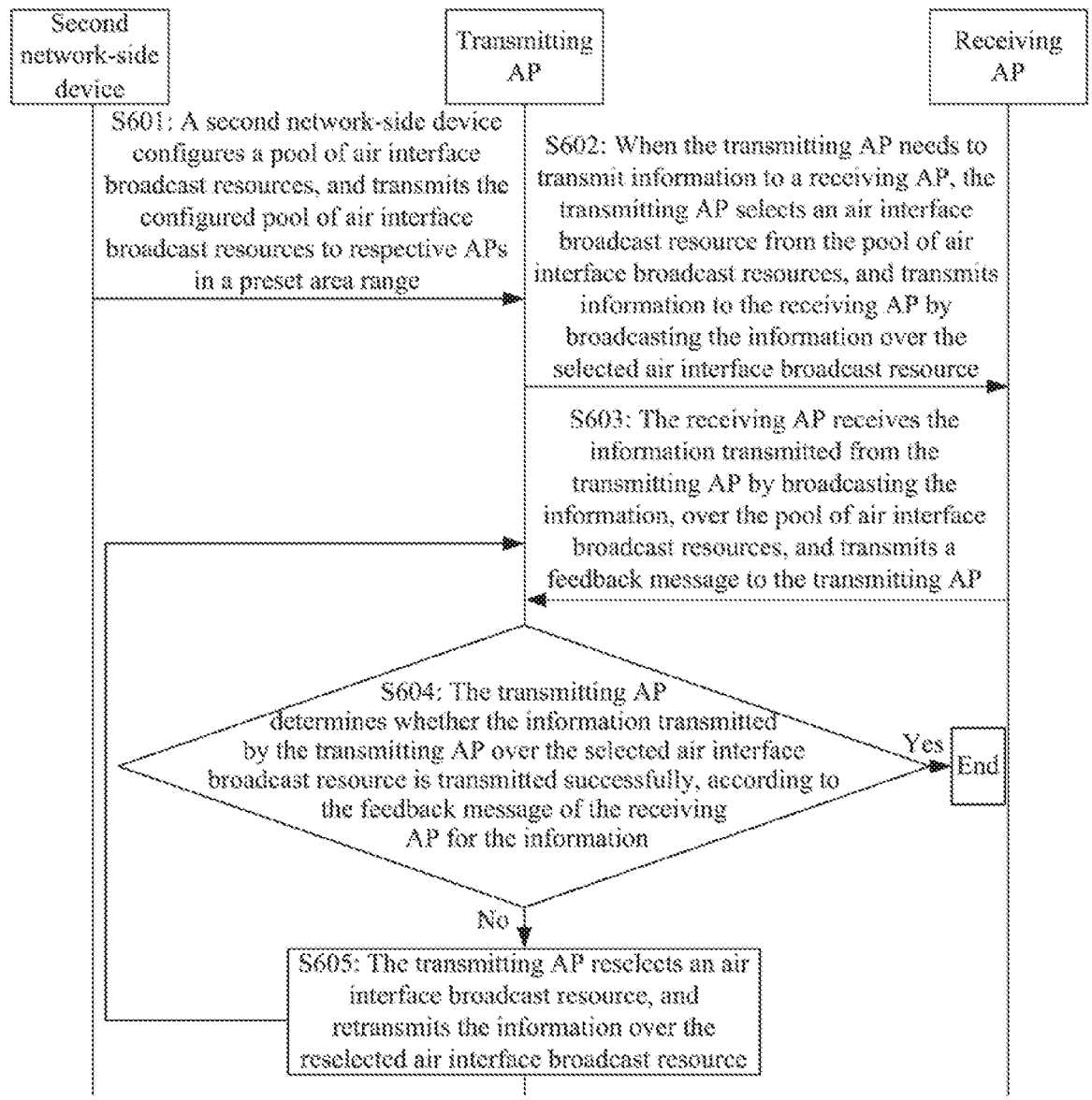
FIG. 6 is a flow chart of a method for exchanging information according to a fifth embodiment of the invention.

As illustrated in FIG. 6, there is illustrated a flow chart of a method for exchanging information according to a fifth embodiment of the invention, where the method includes the following steps.

In the step S601, a second network-side device (e.g., an OAM or a centralized control node) configures a pool of air interface broadcast resources, and transmits the configured pool of air interface broadcast resources to respective APs in a preset area range.

The pool of air interface broadcast resources is a set of resources, and can be configured statically or semi-statically. In a specific implementation, the pool of air interface broadcast resources can alternatively be preset, thus it may not be configured by the second network-side device in this step.

In the step S602, when the transmitting needs to transmit information to a receiving AP, the transmitting AP selects an air interface broadcast resource from the pool of air interface broadcast resources, and transmits information to the receiving AP by broadcasting the information over the selected air interface broadcast resource.

In a specific implementation, a usage rule of the pool of air interface broadcast resources can be specified, and when the AP needs to transmit information, the AP can select according to the usage rule an air interface broadcast resource randomly to avoid interference, and transmit information over the air interface broadcast resource. There may be one or more of the following usage rules of the pool of air interface broadcast resources.

A preempted resource granularity of each AP is specified, for example, a list of allowable resource sizes can be preset, where simply there may be only one allowable resource size; or more flexibly there may be a number of allowable resource sizes. In order to better align resources to thereby alleviate decoding from failing due to resource collision, a relationship between the respective resource sizes (e.g., size1, size2, size3, etc.) can be specified, for example, $size2=2*size1=\frac{1}{2}*size3$, etc.; or the pool of resources can be numbered, where the pool of resources can be numbered in sequence at the granularity of the smallest resource size, for example, some frequency band resource is allocated in some timeslot, and the frequency band resource is divided into a resource 1, a resource 2, and a resource 3 at the granularity of the smallest resource size, and a UE can only select N blocks of resources from the resources, where N≥1.

An encoding format is specified, for example, only one or more encoding formats are supported, and when only one of the encoding formats is specified for a receiver, then the receiver may decode information easily; and when more than one of the encoding formats are specified, then the receiver may attempt on decoding information.

In the step S603, the receiving AP receives the information transmitted from the transmitting AP by broadcasting the information, over the pool of air interface broadcast resources, and transmits a feedback message to the transmitting AP.

Optionally the receiving AP feeds an acknowledgement message back to the transmitting AP corresponding to the received information upon determining that the received information is correct; and/or the receiving AP feeds a non-acknowledgement message back to the transmitting AP corresponding to the received information upon determining that the received information is incorrect.

In a specific implementation, a corresponding feedback position can be specified for each block resource, and the non-acknowledgement (NACK) message or the Acknowledgement (ACK) message can be fed back on the corresponding feedback position, where when the receiving AP receives the information normally, then it may not transmit any feedback message or may transmit the ACK message, or when collision occurs, then it may feed back the NACK message; and when the transmitting AP receives the NACK message, then it may consider retransmitting the information.

Optionally when a cluster head AP is a receiving AP, then the cluster head AP may be responsible for making a feedback for information broadcasted by a transmitting AP in a set of APs including the cluster head AP. For example, the transmitting AP selects a block of resource randomly from the pool of air interface broadcast resources, and transmit its air interface information over the block resource, and the cluster head AP feeds back an ACK message upon correct reception of the information, or the cluster head AP feeds back an NACK message upon incorrect reception of the information.

In the step S604, the transmitting AP determines whether the information transmitted by the transmitting AP over the selected air interface broadcast resource is transmitted successfully, according to the feedback message of the receiving AP for the information; and if not, then the flow proceeds to the step S605.

Optionally the transmitting AP can determine whether the information transmitted by the transmitting AP is transmitted successfully, according to a feedback message of any one receiving AP for the information, for example, when the transmitting AP receives an NACK message, then it may determine that the information is not transmitted successfully.

Or, if the cluster head AP is responsible for making a feedback, then the transmitting AP may determine whether the information transmitted by the transmitting AP is transmitted successfully, according to a feedback message of the cluster head AP for the transmitting AP.

In the step S605, the transmitting AP reselects an air interface broadcast resource, and retransmits the information over the reselected air interface broadcast resource, and the flow returns to the step S603.

When the transmitting AP transmits non-real-time information, then it may reselect another air interface broadcast resource, and retransmit the information over the other air interface broadcast resource, upon determining that the information fails to be transmitted. When the transmitting AP transmits real-time information, then it may abort directly, that is, ignore collision, upon failing to transmit the information because if the information transmitted by the AP is real-time information (e.g., voice), then retransmission thereof upon collision occurring may be of little significance because a validity period of time thereof has expired, and at this time, the flow may wait until the AP transmits new information next time, or may trigger transmission of new information ahead of schedule.

Sixth Embodiment

In the fifth embodiment above, the air interface broadcast resource is selected from the pool of air interface broadcast resources directly by preempting the air interface broadcast resource, and the information is transmitted over the air interface broadcast resource, where there is a short delay, but if there occurs information colliding with each other, then there may be a considerable loss. This sixth embodiment provides another resource preemption scheme in which a transmitting AP firstly transmits resource preemption signaling, and then broadcasts the current air interface information over a corresponding resource upon acknowledgement of no error.

Figure 7:
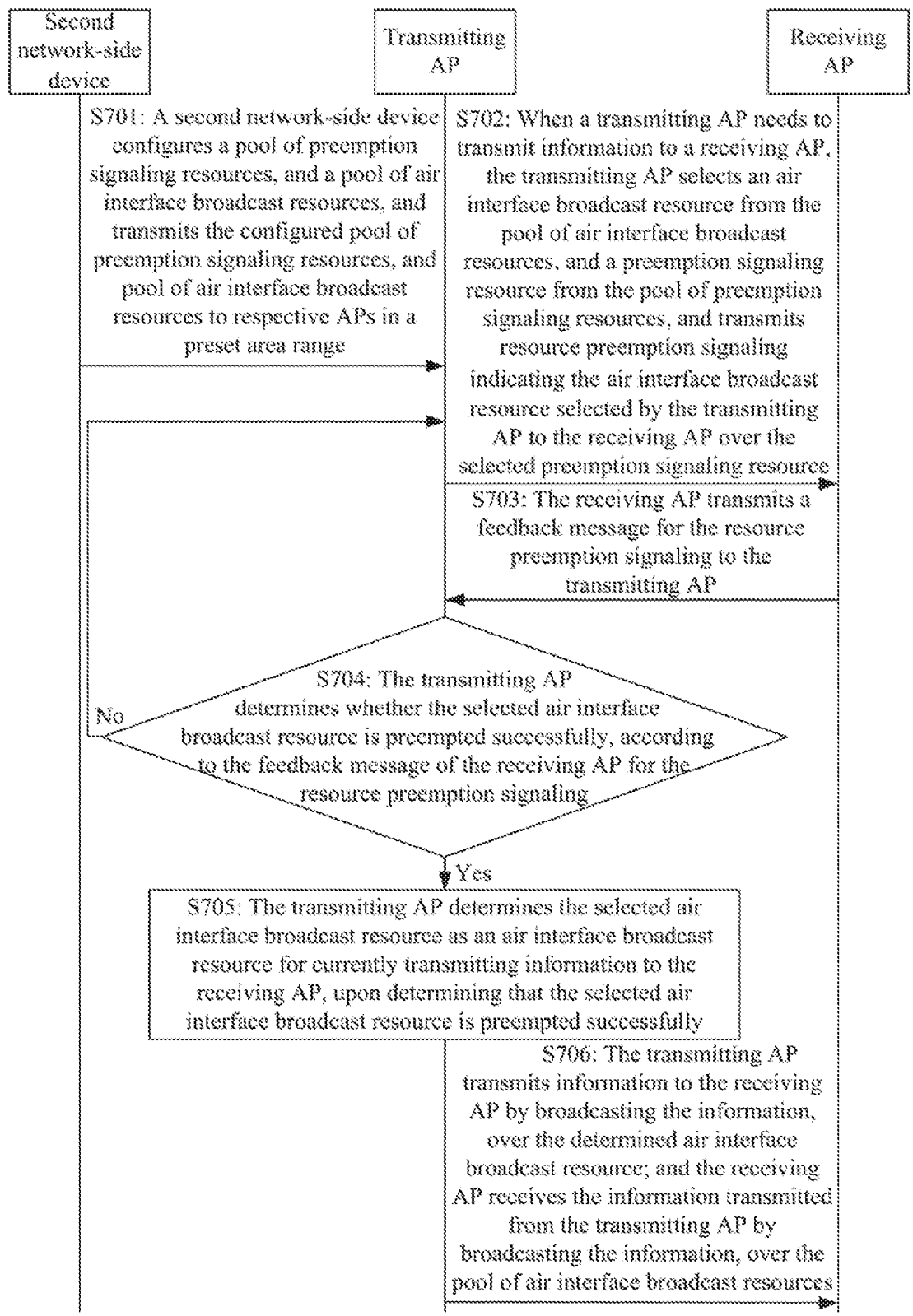
FIG. 7 is a flow chart of a method for exchanging information according to a sixth embodiment of the invention.

As illustrated in FIG. 7, there is illustrated a flow chart of a method for exchanging information according to a sixth embodiment of the invention, where the method includes the following steps.

In the step S701, a second network-side device (e.g., an OAM or a centralized control node) configures a pool of preemption signaling resources, and a pool of air interface broadcast resources, and transmits the configured pool of preemption signaling resources, and pool of air interface broadcast resources to respective APs in a preset area range.

In the step S702, when a transmitting AP needs to transmit information to a receiving AP, the transmitting AP selects an air interface broadcast resource from the pool of air interface broadcast resources, and a preemption signaling resource from the pool of preemption signaling resources, and transmits resource preemption signaling indicating the air interface broadcast resource selected by the transmitting AP to the receiving AP over the selected preemption signaling resource.

In this embodiment, the transmitting AP transmits the resource preemption signaling by broadcasting the signaling. Specifically the second network-side device configures the pool of preemption signaling resources, and the transmitting AP selects the preemption signaling resource from the pool of preemption signaling resources, and transmits the resource preemption signaling to the receiving AP by broadcasting the signaling over the selected preemption signaling resource.

In the step S703, the receiving AP transmits a feedback message for the resource preemption signaling to the transmitting AP.

Optionally the transmitting AP may broadcast the resource preemption signaling only to the cluster head AP, and in this case, the transmitting AP may indicate the receiving AP as the cluster head AP in the resource preemption signaling, or the transmitting AP may not indicate it, in this case, the cluster head AP makes a feedback for the resource preemption signaling by default, and the other receiving APs make no feedback.

In the step S704, the transmitting AP determines whether the selected air interface broadcast resource is preempted successfully, according to the feedback message of the receiving AP for the resource preemption signaling; and if so, then the flow proceeds to the step S705; otherwise, the flow returns to the step S702 (if the information is real-time information, then the flow may abort).

In this embodiment, after the transmitting AP transmits the resource preemption signaling, when it receives a feedback message acknowledging the air interface broadcast resource available (e.g., an acknowledgement (ACK) message), then it may determine that the selected air interface broadcast resource is preempted successfully, and then transmit the current information over the selected air interface broadcast resource; otherwise, it retransmits the resource preemption signaling.

Optionally when the transmitting AP needs to transmit information, after the transmitting AP transmits the resource preemption signaling to the respective corresponding receiving APs, the transmitting may transmit information directly over the selected air interface broadcast resource instead of waiting for an ACK feedback. This implementation where collision is ignored is generally applicable to a scenario where real-time information needs to be transmitted, and since there is such a long delay of the receiving AP in making a feedback for the resource preemption signaling that contradicts a validity period of time of the real-time information, collision shall be ignored, so if there is collision occurring, then the flow may expect a next update to occur, or may trigger next transmission of information ahead of schedule.

In the step S705, the transmitting AP determines the selected air interface broadcast resource as an air interface broadcast resource for currently transmitting information to the receiving AP, upon determining that the selected air interface broadcast resource is preempted successfully.

In the step S706, the transmitting AP transmits information to the receiving AP by broadcasting the information, over the determined air interface broadcast resource; and the receiving AP receives the information transmitted from the transmitting AP by broadcasting the information, over the pool of air interface broadcast resources.

Based upon the same inventive idea, embodiments of the invention further provide apparatuses and devices for exchanging information corresponding to the methods above for exchanging information, and since these apparatuses and devices address the problem under a similar principle to the methods for exchanging information according to the embodiments of the invention, reference can be made to the implementations of the methods for implementations of the apparatuses and the devices, and a repeated description thereof will be omitted here.

Seventh Embodiment

Figure 8:
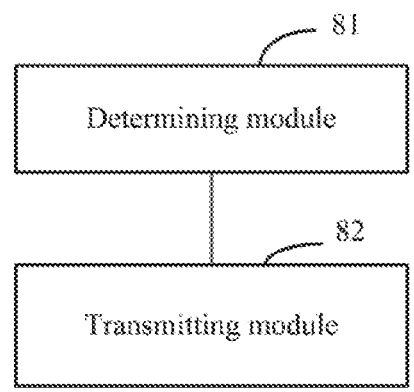
FIG. 8 is a schematic structural diagram of an apparatus for exchanging information according to a seventh embodiment of the invention.

As illustrated in FIG. 8, there is a schematic structural diagram of an apparatus for exchanging information according to a seventh embodiment of the invention, where the apparatus includes the following modules.

A determining module 81 is configured to determine an air interface broadcast resource for a transmitting AP to transmit information to a receiving AP.

A transmitting module 82 is configured to transmit information to the receiving AP by broadcasting the information over the air interface broadcast resource determined by the determining module 81.

Optionally the determining module 81 is configured:

To determine a periodic air interface broadcast resource; or

When information needs to be transmitted to the receiving AP, to determine an air interface broadcast resource for currently transmitting information to the receiving AP.

Optionally the determining module 81 is configured:

To receive the air interface broadcast resource transmitted by a first network-side device.

Optionally the transmitting module 82 is further configured:

Before the determining module 81 receives the air interface broadcast resource transmitted by the first network-side device, to transmit a resource request message including resource demand information to the first network-side device to request for the air interface broadcast resource.

Optionally the first network-side device is any one of the following network-side devices:

A centralized control node managing respective APs in a preset area range; an OAM entity; and A cluster head AP, which is an AP selected from a set of APs including the transmitting AP where any one AP in the set and the cluster head AP can receive air interface information transmitted from each other by broadcasting the information.

Optionally the determining module 81 is configured:

To select the air interface broadcast resource for transmitting information to the receiving AP from a preset pool of air interface broadcast resources; or To receive a pool of air interface broadcast resources configured by a second network-side device, and to select the air interface broadcast resource for transmitting information to the receiving AP from the pool of air interface broadcast resources.

Optionally the second network-side device is a centralized control node managing respective APs in a preset area range, or an OAM entity.

Optionally the transmitting module 82 is further configured:

To determine whether the information transmitted by the transmitting module over the air interface broadcast resource selected by the determining module is transmitted successfully, according to a feedback message of the receiving AP for the information; and if the information is not transmitted successfully, to reselect an air interface broadcast resource, and to retransmit the information over the reselected air interface broadcast resource.

Optionally the transmitting module 82 is configured:

To determine whether the information transmitted by the transmitting module is transmitted successfully, according to a feedback message of any one receiving AP for the information; or To determine whether the information transmitted by the transmitting module is transmitted successfully, according to a feedback message of a cluster head AP for the information, where the cluster head AP is an AP selected from a set of APs including the transmitting AP, and any one AP in the set and the cluster head AP can receive air interface information transmitted from each other by broadcasting the information.

Optionally the transmitting module 82 is further configured, after the determining module 81 selects the air interface broadcast resource for transmitting information to the receiving AP, to transmit resource preemption signaling to the receiving AP to indicate the air interface broadcast resource selected by the determining module.

Optionally the determining module 81 is configured:

To determine whether the selected air interface broadcast resource is preempted successfully, according to a feedback message of the receiving AP for the resource preemption signaling; and to determine the selected air interface broadcast resource as the air interface broadcast resource for transmitting information to the receiving AP, upon determining that the selected air interface broadcast resource is preempted successfully.

Optionally the determining module 81 is configured:

To determine whether the selected air interface broadcast resource is preempted successfully, according to a feedback message of any one receiving AP for the resource preemption signaling; or To determine whether the selected air interface broadcast resource is preempted successfully, according to a feedback message of a cluster head AP for the resource preemption signaling, where the cluster head AP is an AP selected from a set of APs including the transmitting AP, and any one AP in the set and the cluster head AP can receive air interface information transmitted from each other by broadcasting the information.

Eighth Embodiment

Figure 9:
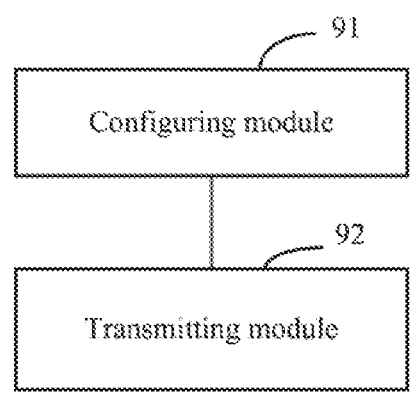
FIG. 9 is a schematic structural diagram of an apparatus for exchanging information according to an eighth embodiment of the invention.

As illustrated in FIG. 9, there is illustrated a schematic structural diagram of an apparatus for exchanging information according to an eighth embodiment of the invention, where the apparatus includes the following modules.

A configuring module 91 is configured to configure a transmitting AP with an air interface broadcast resource for the transmitting AP to transmit information to a receiving AP.

A transmitting module 92 is configured to transmit the air interface broadcast resource configured by the configuring module 91 to the transmitting AP so that the transmitting AP transmits information to the receiving AP by broadcasting the information over the air interface broadcast resource.

Optionally the configuring module 91 is configured:

To configure the transmitting AP with a periodic air interface broadcast resource; or To configure the transmitting AP with an air interface broadcast resource for currently transmitting information to the receiving AP, upon determining that the transmitting AP needs to transmit information to the receiving AP.

Optionally the configuring module 91 is configured:

To receive a resource request message transmitted by the transmitting AP; and to configure the transmitting AP with the air interface broadcast resource according to resource demand information in the resource request message.

Optionally the transmitting module 92 is further configured:

After the transmitting AP is configured with the air interface broadcast resource, to indicate the air interface broadcast resource configured for the transmitting AP to respective receiving APs for the transmitting AP so that each receiving AP receives information transmitted from the transmitting AP by broadcasting the information, over the air interface broadcast resource.

Optionally the configuring module 91 is configured:

To determine the air interface broadcast resource for the transmitting AP from a preset pool of air interface broadcast resources; or To receive a pool of air interface broadcast resources configured by a second network-side device, and to configure the transmitting AP with the air interface broadcast resource from the pool of air interface broadcast resources.

Ninth Embodiment

Figure 10:
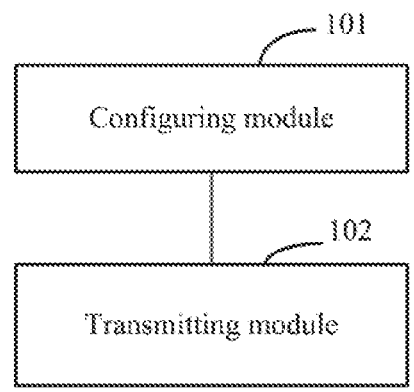
FIG. 10 is a schematic structural diagram of an apparatus for exchanging information according to a ninth embodiment of the invention.

As illustrated in FIG. 10, there is illustrated a schematic structural diagram of an apparatus for exchanging information according to a ninth embodiment of the invention, where the apparatus includes the following modules.

A configuring module 101 is configured to configure a pool of air interface broadcast resources.

A transmitting module 102 is configured to transmit the pool of air interface broadcast resources configured by the configuring module 101 so that each AP transmits information to other APs by broadcasting the information over an air interface broadcast resource in the pool of air interface broadcast resources.

Optionally the transmitting module 102 is configured:

To transmit the pool of air interface broadcast resources configured by the configuring module 101 to respective APs in a preset area range so that each AP selects an air interface broadcast resource for transmitting information to the other APs from the pool of air interface broadcast resources; or To transmit the pool of air interface broadcast resources configured by the configuring module 101 to a cluster head AP in each set of APs in a preset area range so that the cluster head AP configures air interface broadcast resources for the APs in the set including the cluster head AP, where for each set of APs, any one AP in the set and the cluster head AP can receive air interface information transmitted from each other by broadcasting the information.

Tenth Embodiment

Figure 11:
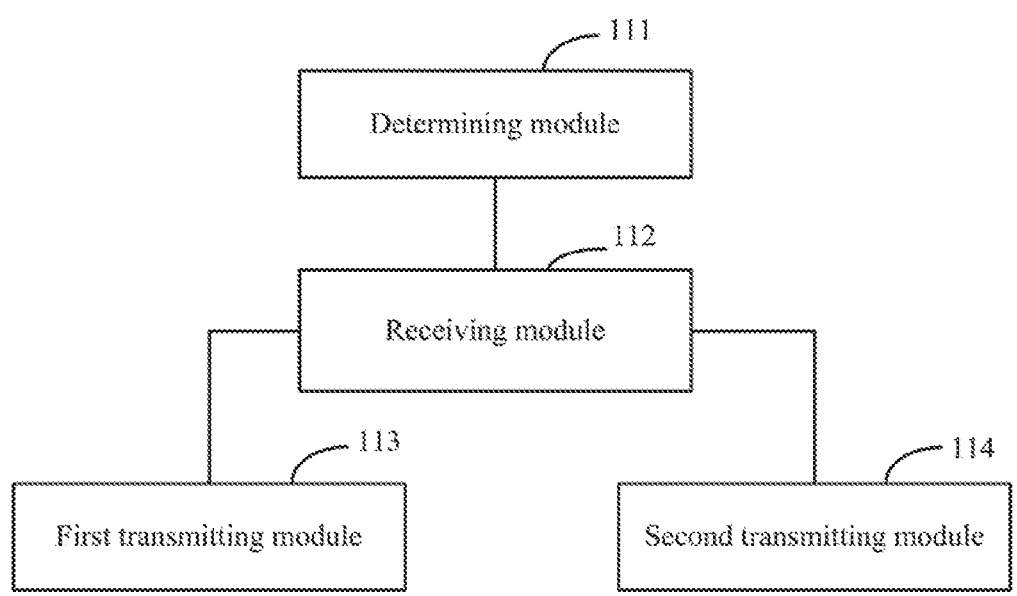
FIG. 11 is a schematic structural diagram of an apparatus for exchanging information according to a tenth embodiment of the invention.

As illustrated in FIG. 11, there is a schematic structural diagram of an apparatus for exchanging information according to a tenth embodiment of the invention, where the apparatus includes the following modules.

A determining module 111 is configured to determine an air interface broadcast resource occupied by a transmitting AP.

A receiving module 112 is configured to receive information transmitted from the transmitting AP by broadcasting the information, over the air interface broadcast resource determined by the determining module 111.

Optionally the determining module 111 is configured:

To determine a periodic air interface broadcast resource occupied by the transmitting AP; or To determine an air interface broadcast resource to be occupied by the transmitting AP for currently transmitting information.

Optionally the determining module 111 is configured:

To receive an air interface broadcast resource of the transmitting AP transmitted by a first network-side device; or To receive a pool of air interface broadcast resources configured by a second network-side device, where the pool of air interface broadcast resources includes air interface broadcast resources which can be occupied by respective APs in a preset area range; or To receive resource preemption signaling transmitted by any one transmitting AP, and to determine an air interface broadcast resource indicated in the resource preemption signaling as an air interface broadcast resource occupied by the any one transmitting AP.

Optionally the apparatus further includes:

A first transmitting module 113 is configured, after the receiving module 112 receives the resource preemption signaling transmitted by any one transmitting AP, to transmit a feedback message for the resource preemption signaling to the any one transmitting AP.

Optionally the apparatus further includes:

A second transmitting module 114 is configured, after the receiving module 112 receives the information transmitted from the transmitting AP by broadcasting the information, to transmit a feedback message for the received information to the transmitting AP.

Optionally the receiving AP is a cluster head AP which is an AP selected from a set of APs including the cluster head AP, where any one AP in the set and the cluster head AP can receive air interface information transmitted from each other by broadcasting the information.

Eleventh Embodiment

Figure 12:
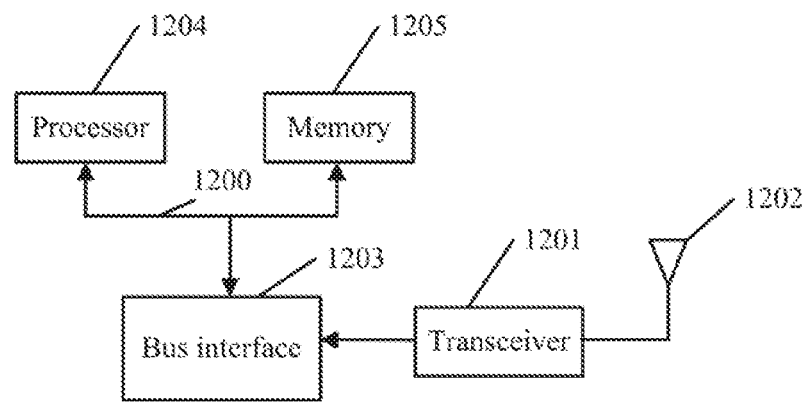
FIG. 12 is a schematic structural diagram of an apparatus for exchanging information according to an eleventh embodiment of the invention.

As illustrated in FIG. 12, there is a schematic structural diagram of an apparatus for exchanging information according to an eleventh embodiment of the invention, where the apparatus includes the following components.

A processor 1204 is configured to read and execute program in a memory 1205:

To determine an air interface broadcast resource for a transmitting AP to transmit information to a receiving AP; and To transmit information to the receiving AP by broadcasting the information through a transceiver 1201 over the determined air interface broadcast resource;

The transceiver 1201 is configured to be controlled by the processor 1204 to receive and transmit data.

Optionally the processor 1204 is configured:

To determine a periodic air interface broadcast resource; or When information needs to be transmitted to the receiving AP through the transceiver 1201, to determine an air interface broadcast resource for currently transmitting information to the receiving AP.

Optionally the processor 1204 is configured:

To receive the air interface broadcast resource transmitted by a first network-side device through the transceiver 1201.

Optionally the processor 1204 is further configured:

Before the air interface broadcast resource transmitted by the first network-side device is received through the transceiver 1201, to transmit a resource request message including resource demand information to the first network-side device through the transceiver 1201 to request for the air interface broadcast resource.

Optionally the first network-side device is any one of the following network-side devices:

A centralized control node managing respective APs in a preset area range; An OAM entity; and A cluster head AP which is an AP selected from a set of APs including the transmitting AP, where any one AP in the set and the cluster head AP can receive air interface information transmitted from each other by broadcasting the information.

Optionally the processor 1204 is configured:

To select the air interface broadcast resource for transmitting information to the receiving AP from a preset pool of air interface broadcast resources; or To receive a pool of air interface broadcast resources configured by a second network-side device through the transceiver 1201, and to select the air interface broadcast resource for transmitting information to the receiving AP from the pool of air interface broadcast resources.

Optionally the second network-side device is a centralized control node managing respective APs in a preset area range, or an OAM entity.

Optionally the processor 1204 is further configured:

After the information is transmitted to the receiving AP by broadcasting the information through the transceiver 1201 over the determined air interface broadcast resource, to determine whether the information transmitted by the transmitting AP over the selected air interface broadcast resource is transmitted successfully, according to a feedback message of the receiving AP for the information; and if the information is not transmitted successfully, to reselect an air interface broadcast resource, and to retransmit the information through the transceiver 1201 over the reselected air interface broadcast resource.

Optionally the processor 1204 is configured:

To determine whether the information transmitted by the transmitting AP is transmitted successfully, according to a feedback message of any one receiving AP for the information; or To determine whether the information transmitted by the transmitting AP is transmitted successfully, according to a feedback message of a cluster head AP for the information, where the cluster head AP is an AP selected from a set of APs including the transmitting AP, and any one AP in the set and the cluster head AP can receive air interface information transmitted from each other by broadcasting the information.

Optionally the processor 1204 is further configured:

After the air interface broadcast resource for transmitting information to the receiving AP is selected, to transmit resource preemption signaling to the receiving AP through the transceiver 1201 to indicate the air interface broadcast resource selected by the transmitting AP.

Optionally the processor 1204 is configured:

To determine whether the selected air interface broadcast resource is preempted successfully, according to a feedback message of the receiving AP for the resource preemption signaling; and to determine the selected air interface broadcast resource as the air interface broadcast resource for transmitting information to the receiving AP, upon determining that the selected air interface broadcast resource is preempted successfully.

Optionally the processor 1204 is configured:

To determine whether the selected air interface broadcast resource is preempted successfully, according to a feedback message of any one receiving AP for the resource preemption signaling; or To determine whether the selected air interface broadcast resource is preempted successfully, according to a feedback message of a cluster head AP for the resource preemption signaling, where the cluster head AP is an AP selected from a set of APs including the transmitting AP, and any one AP in the set and the cluster head AP can receive air interface information transmitted from each other by broadcasting the information.

In FIG. 12, the bus architecture (represented as a bus 1200) can include any number of interconnecting buses and bridges to particularly link together various circuits including one or more processors represented by the processor 1204, and one or more memories represented by the memory 1205. The bus 1200 can further link together various other circuits, e.g., prophetical devices, manostats, power management circuits, etc., all of which are well known in the art, so a further description thereof will be omitted in this context. The bus interface 1203 serves as an interface between the bus 1200 and the transceiver 1201. The transceiver 1201 can be an element, or a number of elements, e.g., a number of transmitters and receivers, which are units for communication with various other devices over a transmission medium. Data processed by the processor 1204 are transmitted over a wireless medium through an antenna 1202, and furthermore data are received by and conveyed through the antenna 1202 to the processor 1204.

The processor 1204 is responsible for managing the bus 1200 and performing normal processes, and can further provide various functions including timing, a peripheral interface, voltage regulation, power supply management, and other control functions. The memory 1205 can store data for use by the processor 1204 in performing the operations.

Optionally the processor 1204 can be a Central Processing Unit (CPU), an Application Specific Integrated Circuit (ASIC), a Field-Programmable Gate Array (FPGA), or a Complex Programmable Logic Device (CPLD).

Twelfth Embodiment

Figure 13:
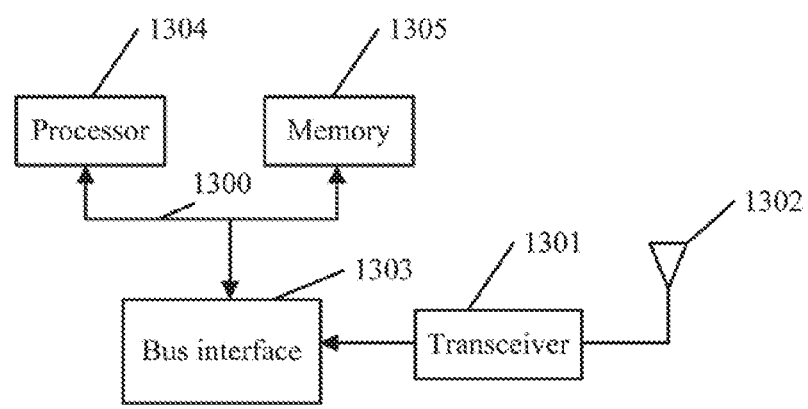
FIG. 13 is a schematic structural diagram of an apparatus for exchanging information according to a twelfth embodiment of the invention.

As illustrated in FIG. 13, there is a schematic structural diagram of an apparatus for exchanging information according to a twelfth embodiment of the invention, where the apparatus includes the following components.

A processor 1304 is configured to read and execute program in a memory 1305:

To configure a transmitting AP with an air interface broadcast resource for the transmitting AP to transmit information to a receiving AP; and To transmit the configured air interface broadcast resource to the transmitting AP through a transceiver 1301 so that the transmitting AP transmits information to the receiving AP by broadcasting the information over the air interface broadcast resource.

The transceiver 1301 is configured to be controlled by the processor 1204 to receive and transmit data.

Optionally the processor 1304 is configured:

To configure the transmitting AP with a periodic air interface broadcast resource; or To configure the transmitting AP with an air interface broadcast resource for currently transmitting information to the receiving AP, upon determining that the transmitting AP needs to transmit information to the receiving AP.

Optionally the processor 1304 is configured:

To receive a resource request message transmitted by the transmitting AP through the transceiver 1301; and To configure the transmitting AP with the air interface broadcast resource according to resource demand information in the resource request message.

Optionally the processor 1304 is further configured:

After the transmitting AP is configured with the air interface broadcast resource, to indicate the air interface broadcast resource configured for the transmitting AP to respective receiving APs for the transmitting AP through the transceiver 1301 so that each receiving AP receives information transmitted from the transmitting AP by broadcasting the information, over the air interface broadcast resource.

Optionally the apparatus for exchanging information is any one of the following network-side devices:

A centralized control node managing respective APs in a preset area range; an OAM entity; and A cluster head AP which is an AP selected from a set of APs including the transmitting AP, where any one AP in the set and the cluster head AP can receive air interface information transmitted from each other by broadcasting the information.

Optionally the apparatus is the cluster head AP.

The processor 1304 is further configured:

To determine the air interface broadcast resource for the transmitting AP from a preset pool of air interface broadcast resources; or To receive a pool of air interface broadcast resources configured by a second network-side device through the transceiver 1301, and to configure the transmitting AP with the air interface broadcast resource from the pool of air interface broadcast resources.

Optionally the second network-side device is a centralized control node managing respective APs in a preset area range, or an OAM entity.

In FIG. 13, the bus architecture (represented as a bus 1300) can include any number of interconnecting buses and bridges to particularly link together various circuits including one or more processors represented by the processor 1304, and one or more memories represented by the memory 1305. The bus 1300 can further link together various other circuits, e.g., prophetical devices, manostats, power management circuits, etc., all of which are well known in the art, so a further description thereof will be omitted in this context. The bus interface 1303 serves as an interface between the bus 1300 and the transceiver 1301. The transceiver 1301 can be an element, or a number of elements, e.g., a number of transmitters and receivers, which are units for communication with various other devices over a transmission medium. Data processed by the processor 1304 are transmitted over a wireless medium through an antenna 1302, and furthermore data are received by and conveyed through the antenna 1302 to the processor 1304.

The processor 1304 is responsible for managing the bus 1300 and performing normal processes, and can further provide various functions including timing, a peripheral interface, voltage regulation, power supply management, and other control functions. The memory 1305 can store data for use by the processor 1204 in performing the operations.

Optionally the processor 1304 can be a Central Processing Unit (CPU), an Application Specific Integrated Circuit (ASIC), a Field-Programmable Gate Array (FPGA), or a Complex Programmable Logic Device (CPLD).

Thirteenth Embodiment

Figure 14:
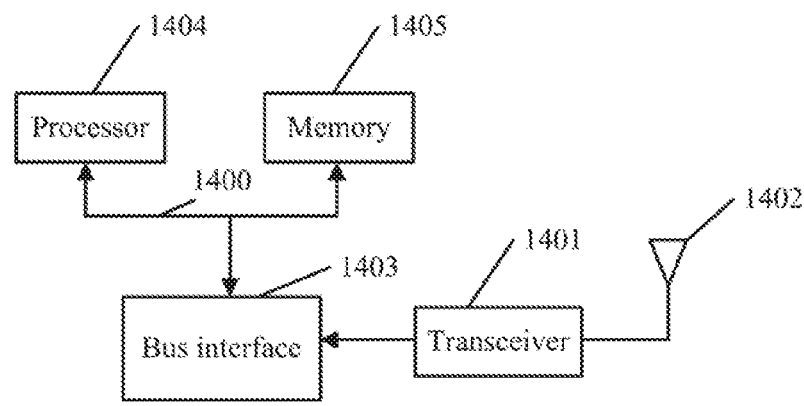
FIG. 14 is a schematic structural diagram of an apparatus for exchanging information according to a thirteenth embodiment of the invention.

As illustrated in FIG. 14, there is illustrated a schematic structural diagram of an apparatus for exchanging information according to a thirteenth embodiment of the invention, where the apparatus includes the following components.

A processor 1404 is configured to read and execute program in a memory 1405:

To configure a pool of air interface broadcast resources; and

To transmit the configured pool of air interface broadcast resources through a transceiver 1401 so that each AP transmits information to other APs by broadcasting the information over an air interface broadcast resource in the pool of air interface broadcast resources.

The transceiver 1401 is configured to be controlled by the processor 1204 to receive and transmit data.

Optionally the processor 1404 is configured:

To transmit the configured pool of air interface broadcast resources to respective APs in a preset area range through the transceiver 1401 so that each AP selects an air interface broadcast resource for transmitting information to the other APs from the pool of air interface broadcast resources; or To transmit the configured pool of air interface broadcast resources to a cluster head AP in each set of APs in a preset area range through the transceiver 1401 so that the cluster head AP configures air interface broadcast resources for the APs in the set including the cluster head AP, where for each set of APs, any one AP in the set and the cluster head AP can receive air interface information transmitted from each other by broadcasting the information.

Optionally the apparatus for exchanging information is a centralized control node managing respective APs in a preset area range; or an OAM entity.

In FIG. 14, the bus architecture (represented as a bus 1400) can include any number of interconnecting buses and bridges to particularly link together various circuits including one or more processors represented by the processor 1404, and one or more memories represented by the memory 1405. The bus 1400 can further link together various other circuits, e.g., prophetical devices, manostats, power management circuits, etc., all of which are well known in the art, so a further description thereof will be omitted in this context. The bus interface 1403 serves as an interface between the bus 1400 and the transceiver 1401. The transceiver 1401 can be an element, or a number of elements, e.g., a number of transmitters and receivers, which are units for communication with various other devices over a transmission medium. Data processed by the processor 1404 are transmitted over a wireless medium through an antenna 1402, and furthermore data are received by and conveyed through the antenna 1402 to the processor 1404.

The processor 1404 is responsible for managing the bus 1400 and performing normal processes, and can further provide various functions including timing, a peripheral interface, voltage regulation, power supply management, and other control functions. The memory 1405 can store data for use by the processor 1404 in performing the operations.

Optionally the processor 1404 can be a Central Processing Unit (CPU), an Application Specific Integrated Circuit (ASIC), a Field-Programmable Gate Array (FPGA), or a Complex Programmable Logic Device (CPLD).

Fourteenth Embodiment

Figure 15:
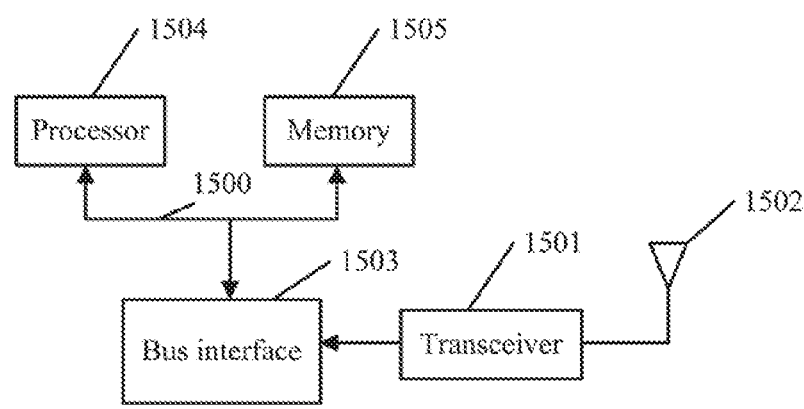
FIG. 15 is a schematic structural diagram of an apparatus for exchanging information according to a fourteenth embodiment of the invention.

As illustrated in FIG. 15, there is a schematic structural diagram of an apparatus for exchanging information according to a fourteenth embodiment of the invention, where the apparatus includes the following components.

A processor 1504 is configured to read and execute program in a memory 1505:

To determine an air interface broadcast resource occupied by a transmitting AP; and To receive information transmitted from the transmitting AP by broadcasting the information, through a transceiver 1501 over the determined air interface broadcast resource.

The transceiver 1501 is configured to be controlled by the processor 1504 to receive and transmit data.

Optionally the processor 1504 is configured:

To determine a periodic air interface broadcast resource occupied by the transmitting AP; or To determine an air interface broadcast resource to be occupied by the transmitting AP for currently transmitting information.

Optionally the processor 1504 is configured:

To receive an air interface broadcast resource of the transmitting AP transmitted by a first network-side device through the transceiver 1501; or To receive a pool of air interface broadcast resources configured by a second network-side device through the transceiver 1501, where the pool of air interface broadcast resources includes air interface broadcast resources which can be occupied by respective APs in a preset area range; or To receive resource preemption signaling transmitted by any one transmitting AP through the transceiver 1501, and to determine an air interface broadcast resource indicated in the resource preemption signaling as an air interface broadcast resource occupied by the any one transmitting AP.

Optionally the processor 1504 is configured:

To transmit a feedback message for the resource preemption signaling to the any one transmitting AP through the transceiver 1501.

Optionally the processor 1504 is configured:

After receiving by the transceiver 1501 the information transmitted from the transmitting AP by broadcasting the information, to transmit a feedback message for the received information to the transmitting AP.

Optionally the receiving AP is a cluster head AP which is an AP selected from a set of APs including the cluster head AP, where any one AP in the set and the cluster head AP can receive air interface information transmitted from each other by broadcasting the information.

In FIG. 15, the bus architecture (represented as a bus 1500) can include any number of interconnecting buses and bridges to particularly link together various circuits including one or more processors represented by the processor 1504, and one or more memories represented by the memory 1505. The bus 1500 can further link together various other circuits, e.g., prophetical devices, manostats, power management circuits, etc., all of which are well known in the art, so a further description thereof will be omitted in this context. The bus interface 1503 serves as an interface between the bus 1500 and the transceiver 1501. The transceiver 1501 can be an element, or a number of elements, e.g., a number of transmitters and receivers, which are units for communication with various other devices over a transmission medium. Data processed by the processor 1504 are transmitted over a wireless medium through an antenna 1502, and furthermore data are received by and conveyed through the antenna 1502 to the processor 1504.

The processor 1504 is responsible for managing the bus 1500 and performing normal processes, and can further provide various functions including timing, a peripheral interface, voltage regulation, power supply management, and other control functions. The memory 1505 can store data for use by the processor 1504 in performing the operations.

Optionally the processor 1504 can be a Central Processing Unit (CPU), an Application Specific Integrated Circuit (ASIC), a Field-Programmable Gate Array (FPGA), or a Complex Programmable Logic Device (CPLD).

Those skilled in the art shall appreciate that the embodiments of the invention can be embodied as a method, a system or a computer program product. Therefore the invention can be 50 embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for exchanging information, the method comprising:
   determining, by a transmitting Access Point (AP), an air interface broadcast resource for transmitting information to a receiving AP; and
   transmitting, by the transmitting AP, information to the receiving AP by broadcasting the information over the determined air interface broadcast resource;
   wherein the determining, by the transmitting AP, the air interface broadcast resource for transmitting information to the receiving AP comprises:
   determining, by the transmitting AP, the air interface broadcast resource as configured by a first network-side device, wherein the first network-side device is a cluster head AP; or
   determining, by the transmitting AP, the air interface broadcast resource for transmitting information to the receiving AP from a pool of air interface broadcast resources configured by a second network-side device, wherein, the second network-side device transmits the configuration information of the pool of air interface broadcast resources to a cluster head AP in each set of the transmitting APs in a preset area range, so that the transmitting AP determines the air interface broadcast resources as configured by the cluster head AP;
   wherein the cluster head AP is an AP selected from a set of APs comprising the transmitting AP, wherein any one AP in the set and the cluster head AP can receive air interface information transmitted from each other by broadcasting the information;
   wherein after the transmitting AP selects the air interface broadcast resource for transmitting information to the receiving AP, the method further comprises:
   transmitting, by the transmitting AP, resource preemption signaling to the receiving AP to indicate the air interface broadcast resource selected by the transmitting AP;
   wherein the determining, by the transmitting AP, the air interface broadcast resource for transmitting information to the receiving AP comprises:
   determining, by the transmitting AP, whether the selected air interface broadcast resource is preempted successfully, according to a feedback message of the receiving AP for the resource preemption signaling; and
   determining, by the transmitting AP, the selected air interface broadcast resource as the air interface broadcast resource for transmitting information to the receiving AP, upon determining that the selected air interface broadcast resource is preempted successfully.

2. The method according to claim 1, wherein before the transmitting AP receives the air interface broadcast resource transmitted by the first network-side device, the method further comprises:
   transmitting, by the transmitting AP, a resource request message comprising resource demand information to the first network-side device to request for the air interface broadcast resource.

3. The method according to claim 1, wherein the second network-side device is a centralized control node managing respective APs in a preset area range, or an Operation Administration and Maintenance (OAM) entity.

4. The method according to claim 1, wherein after the transmitting AP transmits the information to the receiving AP by broadcasting the information over the determined air interface broadcast resource, the method further comprises:
   determining, by the transmitting AP, whether the information transmitted by the transmitting AP over the selected air interface broadcast resource is transmitted successfully, according to a feedback message of the receiving AP for the information; and
   if the information is not transmitted successfully, then reselecting an air interface broadcast resource, and retransmitting the information over the reselected air interface broadcast resource.

5. The method according to claim 4, wherein the determining, by the transmitting AP, whether the information transmitted by the transmitting AP is transmitted successfully, according to the feedback message of the receiving AP for the information comprises:
   determining, by the transmitting AP, whether the information transmitted by the transmitting AP is transmitted successfully, according to a feedback message of any one receiving AP for the information; or
   determining, by the transmitting AP, whether the information transmitted by the transmitting AP is transmitted successfully, according to a feedback message of a cluster head AP for the information, wherein the cluster head AP is an AP selected from a set of APs comprising the transmitting AP, and any one AP in the set and the cluster head AP can receive air interface information transmitted from each other by broadcasting the information.

6. The method according to claim 1, wherein the determining, by the transmitting AP, whether the selected air interface broadcast resource is preempted successfully, according to the feedback message of the receiving AP for the resource preemption signaling comprises:

determining, by the transmitting AP, whether the selected air interface broadcast resource is preempted successfully, according to a feedback message of any one receiving AP for the resource preemption signaling; or determining, by the transmitting AP, whether the selected air interface broadcast resource is preempted successfully, according to a feedback message of a cluster head AP for the resource preemption signaling, wherein the cluster head AP is an AP selected from a set of APs comprising the transmitting AP, and any one AP in the set and the cluster head AP can receive air interface information transmitted from each other by broadcasting the information.

7. A method for exchanging information, the method comprising:

determining, by a receiving Access Point (AP), an air interface broadcast resource occupied by a transmitting AP; and receiving, by the receiving AP, information transmitted from the transmitting AP by broadcasting the information, over the determined air interface broadcast resource;

wherein the determining, by the receiving AP, the air interface broadcast resource occupied by the transmitting AP comprises:

receiving, by the receiving AP, resource preemption signaling transmitted by any one transmitting AP, and determining an air interface broadcast resource indicated in the resource preemption signaling as the air interface broadcast resource occupied by the any one transmitting AP, wherein after the receiving AP receives the resource preemption signaling transmitted by the any one transmitting AP, the method further comprises:

transmitting, by the receiving AP, a feedback message for the resource preemption signaling to the any one transmitting AP.

8. The method according to claim 7, wherein after the receiving AP receives the information transmitted from the transmitting AP by broadcasting the information, over the determined air interface broadcast resource, the method further comprises:

transmitting, by the receiving AP, a feedback message for the received information to the transmitting AP.

9. The method according to claim 7, wherein the receiving AP is a cluster head AP which is an AP selected from a set of APs comprising the cluster head AP, wherein any one AP in the set and the cluster head AP can receive air interface information transmitted from each other by broadcasting the information.

* * * * *